United States Patent
Raciborski et al.

(10) Patent No.: US 9,218,621 B2
(45) Date of Patent: *Dec. 22, 2015

(54) DYNAMIC BANDWIDTH ALLOCATION

(71) Applicant: Limelight Networks, Inc., Tempe, AZ (US)

(72) Inventors: Nathan F. Raciborski, Wilson, WY (US); Michael M. Gordon, Paradise Valley, AZ (US)

(73) Assignee: Limelight Networks, Inc., Tempe, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/944,406

(22) Filed: Jul. 17, 2013

(65) Prior Publication Data

US 2013/0304601 A1    Nov. 14, 2013

Related U.S. Application Data

(63) Continuation of application No. 13/494,620, filed on Jun. 12, 2012, now Pat. No. 8,533,289, which is a continuation of application No. 11/195,143, filed on Aug. 1, 2005, now Pat. No. 8,214,450.

(51) Int. Cl.
*G06F 15/16* (2006.01)
*G06Q 30/08* (2012.01)
(Continued)

(52) U.S. Cl.
CPC .......... *G06Q 30/08* (2013.01); *H04L 29/06027* (2013.01); *H04L 41/0896* (2013.01); *H04L 65/4084* (2013.01); *H04L 67/1023* (2013.01); *H04L 41/509* (2013.01)

(58) Field of Classification Search
CPC ................................................ H04L 29/06027

USPC ................................. 709/201, 217; 705/26.3
See application file for complete search history.

(56) References Cited

U.S. PATENT DOCUMENTS

| 5,842,178 A | * | 11/1998 | Giovannoli | 705/26.4 |
| 6,038,594 A | | 3/2000 | Puente et al. | |

(Continued)

FOREIGN PATENT DOCUMENTS

WO    0070519 A2    11/2000

OTHER PUBLICATIONS

Extended European Search Report for EP 06801099.0, dated Jul. 7, 2014, 10 pages.

(Continued)

*Primary Examiner* — Emmanuel L Moise
*Assistant Examiner* — Marie Georges Henry
(74) *Attorney, Agent, or Firm* — Kilpatrick Townsend & Stockton, LLP

(57) ABSTRACT

According to the invention, a content delivery network (CDN) for delivering content objects from a content provider to a recipient is disclosed. The CDN includes a dynamic pricing engine and a second web location. The dynamic pricing engine is coupled to a first web location. The first web location, which is associated with a content provider, allows the recipient to order a content object. The delivery quote is solicited by the first web location for delivering a content object one or more times. The second web location delivers the content object to a recipient system of the recipient. The second web location is associated with the dynamic pricing engine. The dynamic pricing engine automatically produces the delivery quote, which is affected by at least one of the content object or a web location of the recipient system.

20 Claims, 19 Drawing Sheets

(51) Int. Cl.
*H04L 29/06* (2006.01)
*H04L 12/24* (2006.01)
*H04L 29/08* (2006.01)

(56) References Cited

U.S. PATENT DOCUMENTS

| | | |
|---|---|---|
| 6,055,518 A | 4/2000 | Franklin et al. |
| 6,134,589 A | 10/2000 | Hultgren |
| 6,459,683 B2 | 10/2002 | Busuioc et al. |
| 6,646,990 B1 | 11/2003 | Gray et al. |
| 6,687,682 B1 | 2/2004 | Esfandiari et al. |
| 6,950,821 B2 | 9/2005 | Faybishenko et al. |
| 6,975,594 B1 | 12/2005 | Byers |
| 7,155,478 B2 * | 12/2006 | Ims et al. ............ 709/203 |
| 7,269,157 B2 * | 9/2007 | Klinker et al. ............ 370/351 |
| 7,414,978 B2 | 8/2008 | Lun et al. |
| 7,925,568 B2 | 4/2011 | Cullen et al. |
| 2001/0049636 A1 | 12/2001 | Hudda et al. |
| 2001/0051911 A1 | 12/2001 | Marks et al. |
| 2002/0049667 A1 | 4/2002 | Navani et al. |
| 2003/0149581 A1 | 8/2003 | Chaudhri et al. |
| 2003/0149755 A1 | 8/2003 | Sadot |
| 2004/0249939 A1 | 12/2004 | Amini et al. |
| 2005/0278518 A1 | 12/2005 | Ko et al. |

OTHER PUBLICATIONS

International Search Report and Written Opinion for PCT/US06/31144, dated Aug. 4, 2008; 10 pages.

* cited by examiner

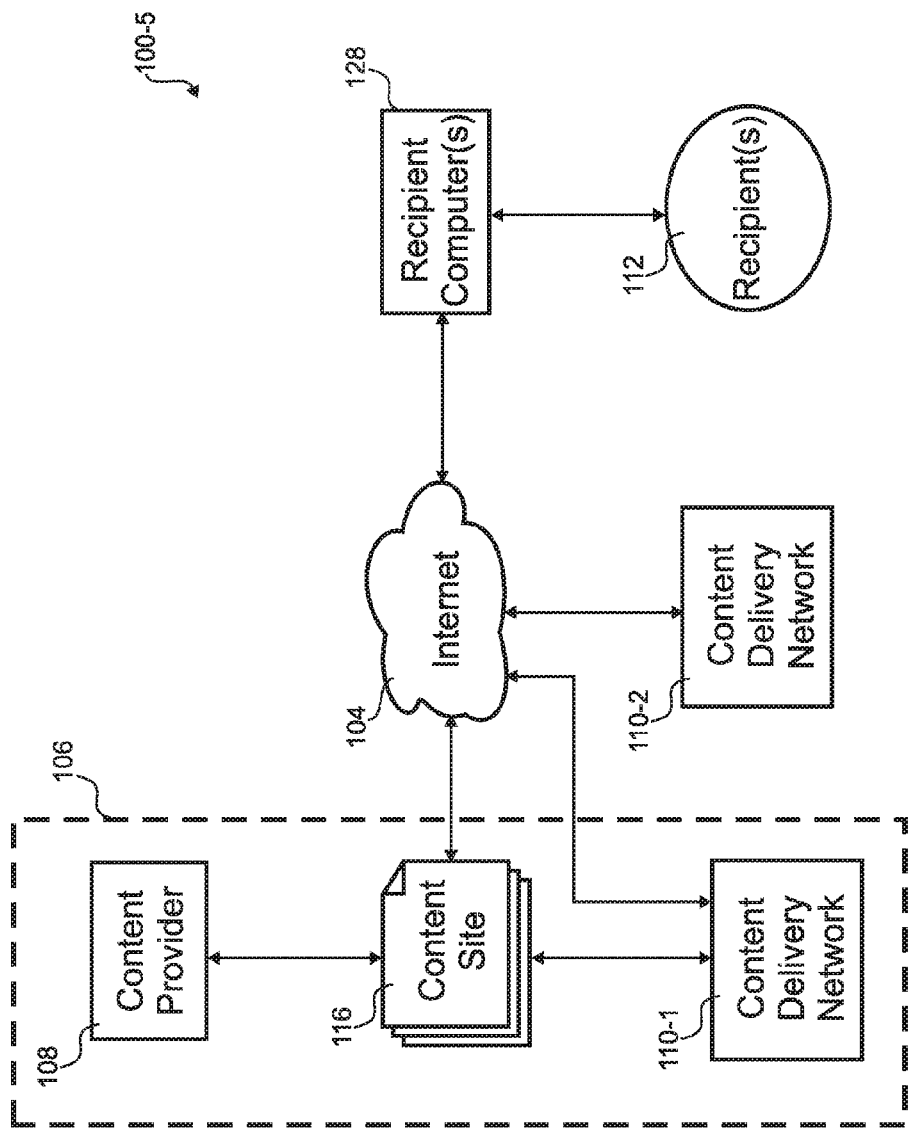

DYNAMIC BANDWIDTH ALLOCATION

CROSS-REFERENCE TO RELATED APPLICATION

This application is a continuation of application Ser. No. 13/494,620 filed Jun. 12, 2012, which is a continuation of application Ser. No. 11/195,143 filed Aug. 1, 2005; each of which is hereby incorporated by reference in its entirety for all purposes.

BACKGROUND OF THE DISCLOSURE

This disclosure relates in general to content delivery and, more specifically, but not by way of limitation, to dynamic bandwidth allocation for content delivery.

A content delivery network (CDN) is used by many web sites to deliver content more efficiently. The CDN may host, mirror or cache the content as well as deliver it to a requesting party. A web site or origin server is linked to the CDN such that some or all content can be sourced from the CDN rather than the web site. This process of fulfilling a link through a CDN is usually transparent to the user.

A web site may contract with a CDN to deliver a particular content object or stream a set number of times. After that set number is exceeded, the web site may remove the link or the CDN could prevent further delivery of the content object or stream. For example, a 200 Kbps stream may be made available to the first 10,000 requestors for a particular news event, but subsequent visitors to the web site would not see the link to the stream.

The interface between an origin server and a CDN is binary today where some consumers are lost in the hand-off. Links are provided to the CDN and those links are either fulfilled or not by the CDN posed with those links. From the consumer perspective, a CDN that fails to fulfill a link appears broken.

BRIEF DESCRIPTION OF THE DRAWINGS

The present disclosure is described in conjunction with the appended figures:

FIGS. 1A-1F are block diagrams of embodiments of a content system;

Figure 1A:
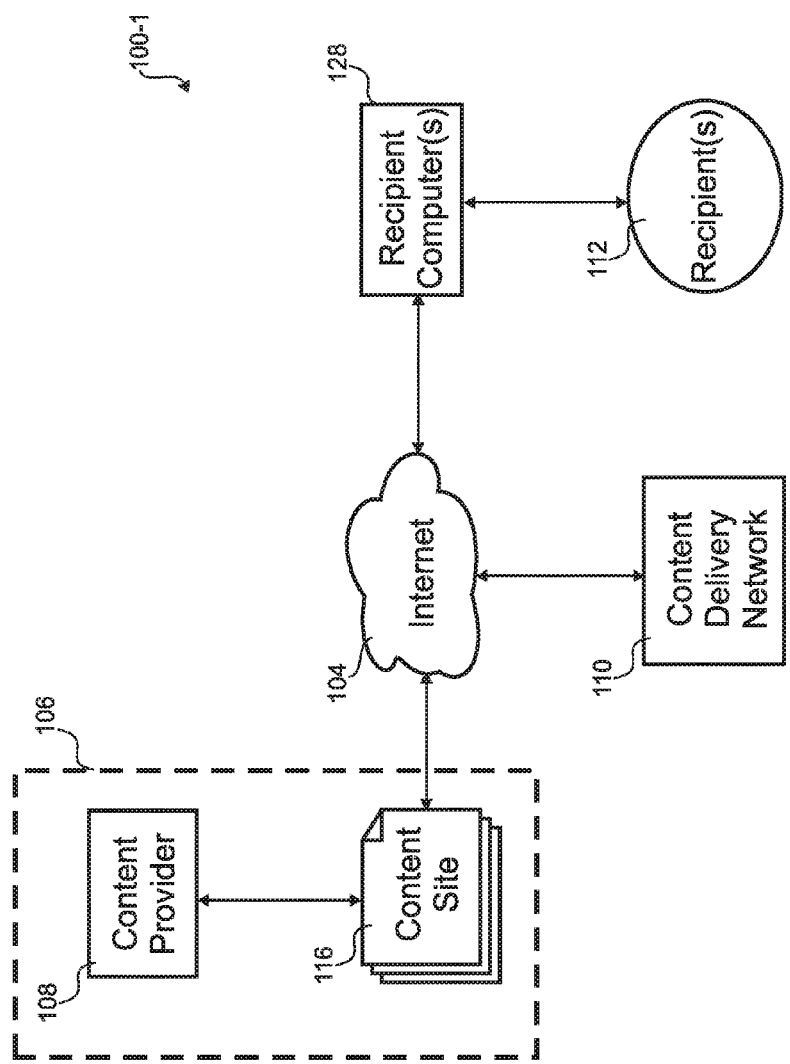

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

With reference to FIG. 1A, a content system 100-1 is shown where a content originator 106 offloads the delivery of the content objects to a content delivery network (CDN) 110. The content originator 106 produces a content object and includes a content provider 108 and a content or web site 116. A content object is any content file or content stream and could include, for example, software, audio, video, pictures and/or text. Many content providers 108 use a CDN 110 to deliver the content objects to customers or recipients 112. Once a content object is selected by the recipient 112, the CDN 110 is passed the delivery address and information to retrieve the content object. The CDN 110 then sources the content object to the recipient 112. The content provider 108 typically pays the CDN 110 for the delivery of the content object.

The content originator 106 is the source or redistributor of content objects. The content site 116 is a web site viewable with a web browser of the recipient. In other embodiments, the content site 116 could be accessible with application software other than a web browser. Links on the content site 116 are customized to allow delivery through one or more CDNs 110. The content provider 108 can redirect content requests to any CDN after they are made or can formulate the delivery path when the web page is formulated. Negotiation with CDNs 110 can occur before or after the request for a content object is made in various embodiments.

The cost structure of a CDN 110 can be generally divided into two large classes, namely, serving costs and delivery costs. Serving costs include hardware (e.g., computers, storage systems, backup systems, networking equipment, etc.), services (e.g., setup costs, maintenance, programming, etc.), facility costs, and other overhead. These serving costs are affected by such things as the type of networks used for delivery, data rates, processing demands, object size, etc. Often, the worst case demand scenario guides the serving costs used to support a particular project. The cost structure of serving costs are treated differently than delivery costs in some cost models.

A conventional CDN uses a flat rate for delivery such that a single delivery cost is offered for a given project regardless of actual costs for each object. The route chosen from the CDN 110 to the recipient computer 128 in the disclosed invention influences the delivery costs in many cases. Transfer from the CDN 110 to a non-peer network can cost the CDN 110 different negotiated amounts. For example, transfer of the content object to one tier 1 network might have a delivery cost of $30 MB/min, but another tier 1 network with lower quality of services (QoS) might have a delivery cost of $20 MB/min. A peer network does not charge for transfer to its recipients such that traffic to a peer network can be done at a far lower delivery cost. Networks that receive traffic egress from a tier 1 network for their recipients are also charged, for example, the tier 1 provider might be paid $7 MB/min for egress from the tier 1 network.

In an embodiment of the current invention, the pricing is flexible and affected by cost models for the CDN 110 for delivering a particular content object. The serving costs and the delivery costs can be logically separated even though the content originator may have varying levels of visibility into these costs when options are presented. The delivery costs can be customized for the size of the object, the time of day, the time or day of the year, loading of the coupled delivery networks, maximum bandwidth, maximum number of connections, location of recipient, routing to recipient, level of QoS, encoding format, type of content object (e.g., streaming, error corrected, file download), and/or an other characteristic that can affect delivery costs. Serving costs can also be customized for the size of the object, the time of day, the time or day of the year, loading of CDN networks and systems, maximum bandwidth, maximum number of connections, routing equipment resources, encoding format, type of content object (e.g., streaming, error corrected, file download), and/or an other characteristic that can affect serving costs.

Figure 1B:
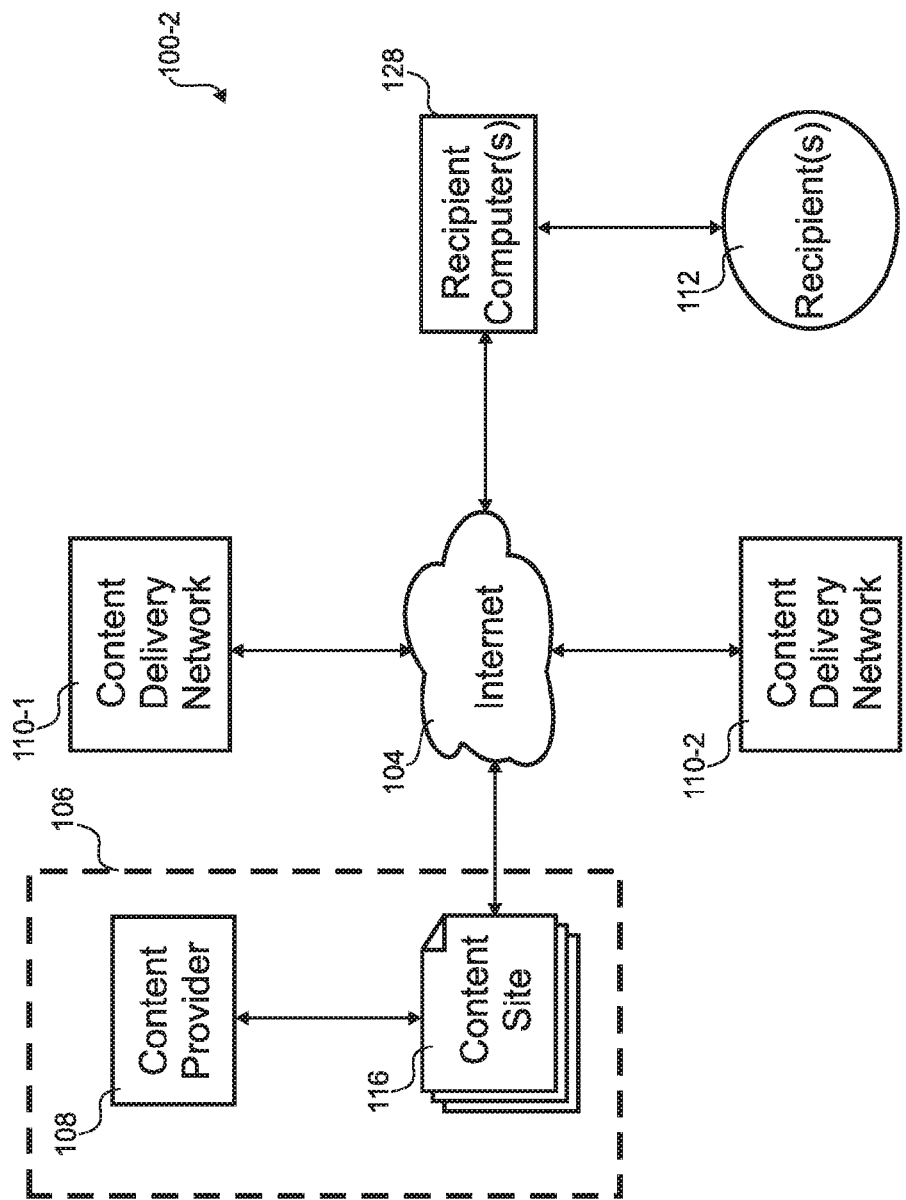

Referring next to FIG. 1B, a block diagram showing another embodiment of the content system 100-2 is shown. This embodiment has two CDNs 110-1, 110-2. The content provider 108 can choose either to deliver a particular content object. Depending on loading, recipient location, resources, QoS, price, etc. the content provider 108 may choose one CDN over another. This choice can be made by default for a certain content object, as a web page is formulated or after the content object is requested in various embodiments. The chosen CDN may be given certain parameters to control delivery in advance of request or with the request. For example, the universal resource identifier (URI) could embed certain options or the content provider 108 could be informed before the URI is fulfilled.

Figure 1C:
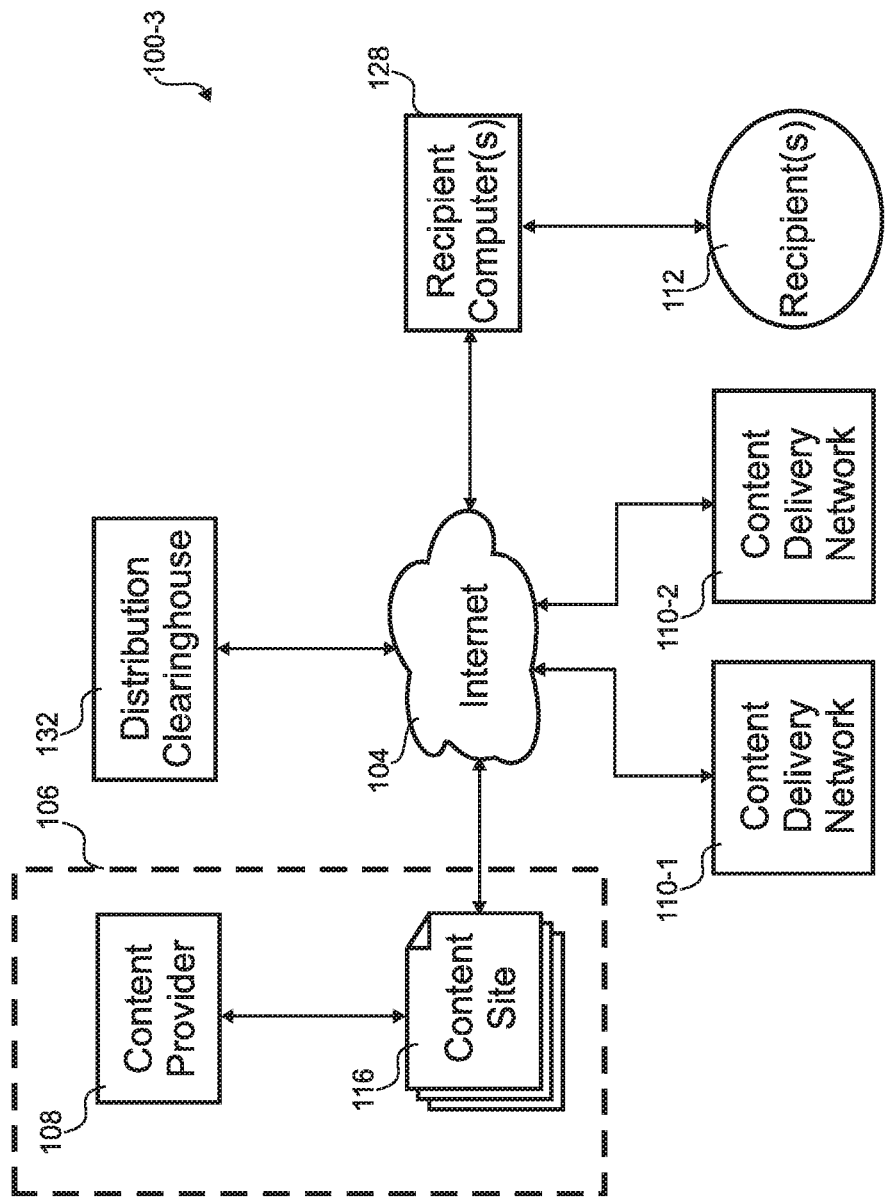

With reference to FIG. 1C, a block diagram showing another embodiment of the content system 100-3 is shown. This embodiment includes a distribution clearinghouse 132 to arbitrate delivery with a number of CDNs 110. Shown are two CDNs, but there could be any number in various embodiments. The content originator 106 may prefer different CDNs 110 based upon price, QoS, loading, capabilities, redundancy, etc.

A content originator 106 may work with any number of CDNs 110 who could deliver a content object according to some scheme. Each CDN 110 could be queried for their price and the content provider could go with the cheapest, for example. There could be other factors, such as QoS for delivery, which could also affect the choice. Some embodiments could have each CDN contracted at a set price and the content provider 108 could query each for acceptance at the agreed price by starting with the cheapest and working toward the most expensive. Each CDN would either accept or decline delivery at that price.

In another embodiment, a particular CDN 110 could have several contract prices to cover delivery to the various terminal network recipients. A query to the CDN 110 could indicate the relevant contract price for a particular recipient 112. By querying a number of CDNs 110, the content originator 106 could choose the one best able to source the content object.

In yet another embodiment, each CDN 110 could dynamically price delivering a particular content object to a particular network location of a recipient 112. The CDN delivering costs are influenced by where the object will egress from the CDN system and specifically what serving resources will be consumed. One example would be for a content provider 108 to know the IP address for the recipient computer 128. The CDN 110 can determine the routing path and cost, and quote the price for delivering this object to IP address for the particular recipient 112. Factors such as routing through networks, Border Gateway Protocol (BGP) tables, any contract terms between the content provider 108 and CDN 110, size of the content object, QoS desired for delivery, type of content object, protocol used to deliver the content object, loading of the CDN systems, temporal considerations (e.g., time of day, day of month, month of year, holidays, etc.), volume discounting for this content provider 108, existence of peer agreements, cost of egress onto a non-peer network and/or other factors influence the cost model. Additionally, live streams could be bid differently as they would typically be connections that are longer in duration, which could impact costs.

The content provider 108 sends various information to the one or more CDNs 110 to enable dynamic pricing. Things such as IP Address of the recipient computer 128, QoS desired, full object location (i.e., server, path and name), if delivery can be delayed, type of content object, protocol used to deliver the content object, and/or other factors. For real-time quotes, the CDN 110 replies back with a price and a URI that can be used if the price is acceptable. Once the URI is used an accounting is done for payment. Although this embodiment uses a URI to indicate the content object, any object tag, hyperlink or other indicator of a specific object or stream could be used. There could be a refund where the complete object is not successfully downloaded. Where there are multiple CDNs 110, the content provider 108 would use the URI that provides the best value from the multiple responses.

The distribution clearinghouse 132 aids the content originator 106 in choosing a CDN 110. The CDNs 110 can give advance quotes on content delivery or bid in real time. In either case, the various CDNs 110 will receive information on the content object(s) and/or the recipient computer 128 to provide one or more pricing options for delivery. The distribution clearinghouse 132 can provide information on the content object(s) and/or recipient(s) 112 for real time bidding.

For advance quote situations, the CDNs 110 can give pricing for various types of recipient locations, recipient networks and content objects. For example, a conventional CDN 110 might say any object delivered for $40 MB/min. A CDN that has a cost model can say that for a particular sized content object, encoding format, time of day, day of the year, QoS level, and recipient location the price is $15 MB/min, but is $60 MB/min for another situation.

For a real-time quote situation, the CDN 110 is given the content object and recipient information and one or more quotes are provided from the various CDNs 110. Where more than one quote is given for a particular CDN, various QoS options distinguish the quotes. For example, a high QoS that delivers the content object quickly may have a $50 MB/min, but a lower QoS could cost $20 MB/min. Varying QoS could result from different serving resources, routing paths and terminal network QoS issues.

The distribution clearinghouse 132 can present the various options for the different CDNs in the abstract for advance quote situations. These options could be various prices for different recipient locations, times of day, days of the year, QoS levels, terminal networks, routing paths, content object sizes, content object encoding, content object streaming protocol, routing paths, etc. The QoS levels could have datarate limits, latency specifications, lost packet rates, hop limits, routing options, and/or anything else that might affect the perceived quality of the content delivery.

In some embodiments, decisions on routing are passed to the CDN 110 along with some guidelines or rules. A content originator 106 specify that the CDN 110 automatically make decisions for each URI passed to the CDN 110 without involving the content originator 106 in each transaction. The URI would not need to specify any options in this embodiment. The content originator 106 could specify any number of ways to automatically handle object requests with thresholds and limits. The threshold or limits could be based upon any number of factors such as cost, bandwidth utilization, time of day, time of year, number of requests, loading, country or location of recipient, object size, bitrate, or any other metric related to delivering content.

In one example, the content originator 106 specifies that all requests that would cost more than $25 MB/min would be sent a 300 kbps version of the content object or stream. For a request that would be less than $25 MB/min, a 600 kbps version of the content object or stream could be used. In another example, the content originator 106 could specify that only $5,000 per hour be incurred at a high bitrate before all requests over that limit would be sourced at a low bitrate. One example could have the content originator 106 specify that the first 8,000 requests for a content object or stream be a low bitrate until it switches to a higher bitrate for the next 5,000 requests when a much lower bitrate is used. Another example could have the content originator specify that the first 1,000 requests over a time period would be fulfilled, but after that point, a percentage of the requests could go unfulfilled. There could be any number of rules and thresholds specified to allow a content originator 106 to manage their use of a CDN 110.

Figure 1D:
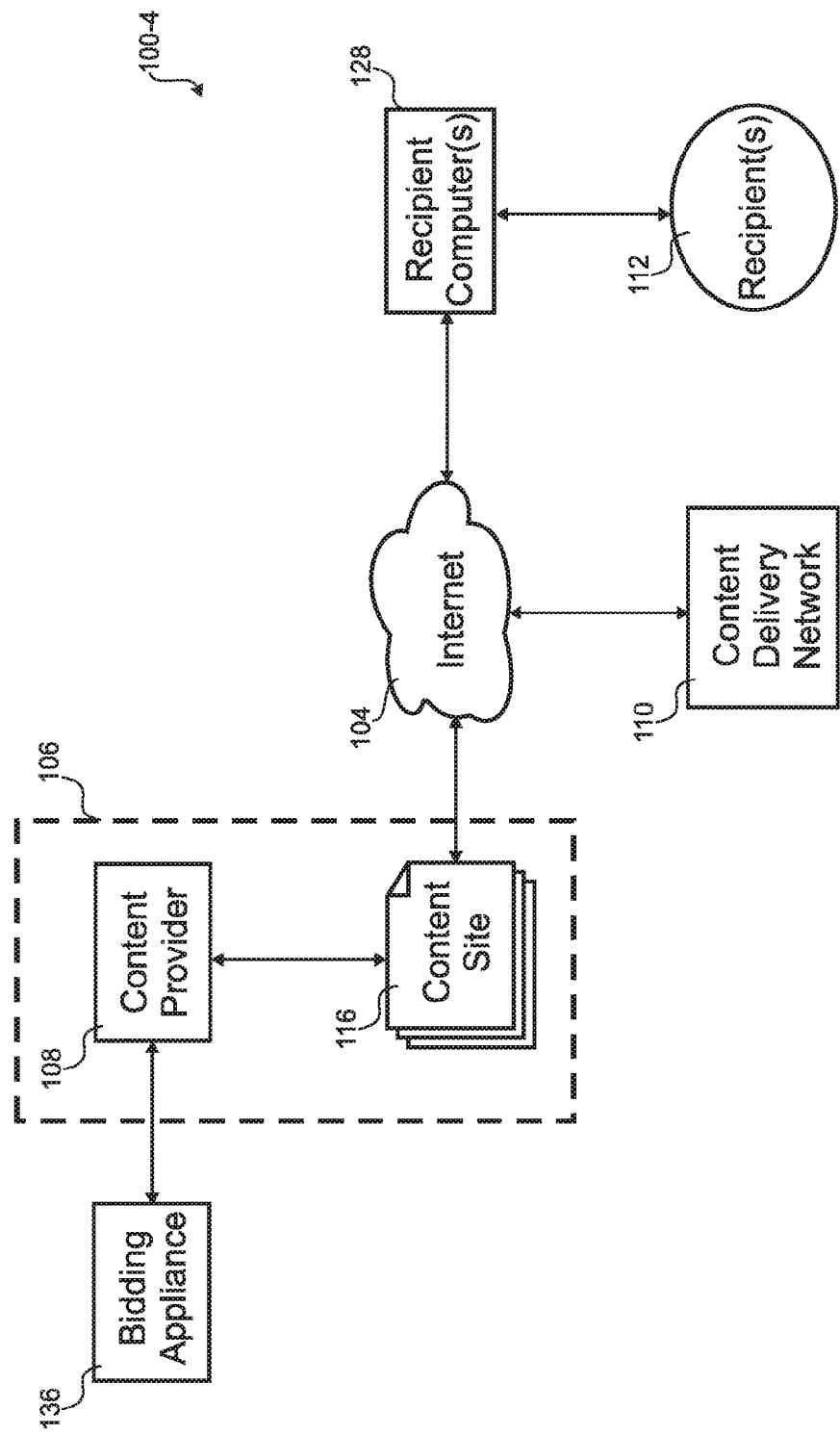

Referring next to FIG. 1D, a block diagram showing another embodiment of the content system 100-4 is shown. This embodiment includes a bidding appliance 232 coupled to the content originator 106. The bidding appliance 232 has a cost model for the CDN 110 such that real time quote and advance quotes can be responded to. Any updates to the cost model can be performed remotely by the CDN 110. Some embodiments could have multiple bidding appliances for multiple CDNs. Other embodiments might have bidding appliances for some CDNs, but not for others such that a bid request would go out to those CDNs.

In some embodiments a bidding or decision-making appliance 232 may be located at the content provider location, the CDN location or elsewhere on the Internet 104 to estimate the cost of delivery for each content object. The bidding appliance 232 may provide a minimum charge, a maximum charge, a price increment over some predetermined base charge, and/or any other pricing term that the parties may use. A query to the bidding appliance 232 would result in a bid. Fulfillment of the delivery would be performed by the CDN 110 in the conventional manner if the bid is chosen by the content provider 108. The bidding appliance 232 will generally work better when located close to the content site 116 so the response times are as fast as possible when getting quotes. This might mean bidding appliance 232 is located near the content site 116 via the closest possible network connection or that it is actually installed at the same location as the content site 116. The bidding appliance 232 understands Zero CIR economics, in addition to overall network costs, such that an accurate bid can be produced.

The bidding appliance 232 also knows if the content object is available for delivery at all. Where the content object cannot be found, the quote would so indicate or no quote would be made. Where a file is indicated as missing, the content provider 108 could supply it to the CDN 110 for the present delivery and possible future deliveries. The bidding appliance 232 can be used in situations where there is no bidding and just an internal decision making For example, where the CDN 110 is integral to the content originator 106 there may be back and forth quoting and decision making to choose a particular delivery option.

The bidding for delivery could use any type of bidding format. In one embodiment, the CDN 110 is asked to deliver the content object for a particular price. After analysis of the costs, the CDN 110 could either accept or reject the offer. The content provider could go to other CDNs 110 and/or counteroffer to the first CDN 110. Other embodiments solicit quotes in a serial or parallel fashion from a number of CDNs 110. An adoptable bid request standard could be used, where a single request from content provider 108 could get multiple responses from multiple CDNs, or the content provider could make multiple requests to multiple carriers.

The format of the exchange between the content provider and the bidding appliance 232 or CDN 110 could have any form. Here is an example of the URI that might be passed from the content provider 108 to the bidding appliance 232 or CDN 110: <protocol: path\object_name.ext><size><crc><IP_address> (the "Bid URI"). After determining the bid price, the CDN 110 or bidding appliance 232 would respond. For example, here is a sample response: <provider><price {GB transfer or Mbps or both}><full_url><historical speed statistic><yes/no if object exists in network by name or crc><number of network hops to get to the end user (AS#'s), or an on-net, off-net, near-net rating> (the "Delivery URI"). The Bid URI could provide various options that the content provider 108 wants to select from the CDN 110. The Delivery URI could also have a unique identifier for the request, indicators of selected options, options available for selection, etc. In other words, the content provider 108 and CDN 110 can pass parameters though the URIs. Other embodiments could send parameters outside of the URI in addition to or instead of embedding them in the URI.

The content provider 108 can rewrite the URI (the "Redirect URI") before passing the Redirect URI to the recipient computer 128 for redirection to the CDN. For example, the Delivery URI might indicate that there are three bitrates for the content object. The content provider 108 can rewrite the Redirect URI to indicate which bitrate to use. The CDN 110 would receive the Redirect URI from the recipient computer 128 and provide the appropriate bitrate.

When the content provider receives a Delivery URI, some of those could be surreptitiously used by cheating content providers or recipients who indicate the recipient computer 128 is available by a cheaper route than that actually used to download the content object. In some cases, this could be intentional or inadvertent. Regardless, cheaters can be dealt with in a couple of different ways. Where a cheating content provider or recipient obtains a Delivery URI that is used in an unanticipated way with a CDN 110, the CDN 110 could deliver the content and charge the content provider 108 for the delivery at the correct price for the route actually used even if that is different from the original quote. In an alternative embodiment, the CDN 110 could cry foul and not deliver the content object once the alternate routing is detected. In another embodiment, the CDN 110 could redirect the violating user to a webpage describing the problem and offering a solution(s).

With reference to FIG. 1E, a block diagram showing another embodiment of the content system 100-5 is shown. This embodiment includes two CDNs 110. A captive CDN 110-1 is part of the content originator 106 and an external CDN 110-2 is separate from the content originator 106. In embodiments such as this, a captive CDN 110-1 can be used to deliver content.

There are both serving and delivery costs for the captive CDN 110-1. A cost model of these serving and delivery costs allows the content provider 108 to decide whether the captive CDN 110-1 or the external CDN 110-2 should deliver a particular piece of content. Even though the captive CDN 110-1 may not have incremental cost of serving a piece of content, the external CDN 110-2 may be preferred where the cost model for the captive CDN 110-2 would report unfavorably. Although this embodiment shows the captive CDN 110-1 being separate from other parts of the content originator 106, it is to be understood that portions of the various blocks in content originator 106 may be combined or separated in any number of ways.

Figure 1F:
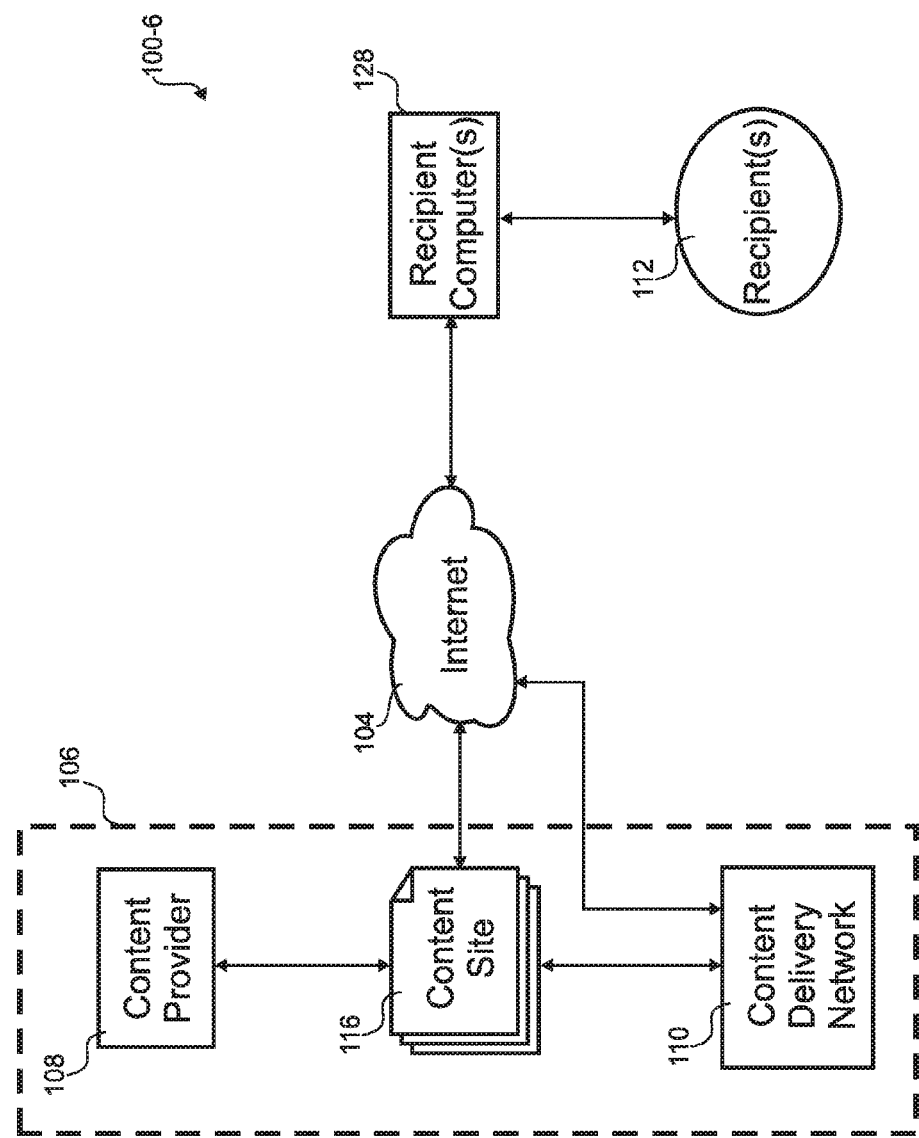

Referring next to FIG. 1F, a block diagram showing another embodiment of the content system 100-6 is shown. In this embodiment, there is only a captive CDN 110. All content object requests are either sourced from the CDN 110 or the content site 116 directly at the choosing of the content provider 108. The CDN 110 can provide one or more delivery options that the content provider 108 would choose from.

Figure 2A:
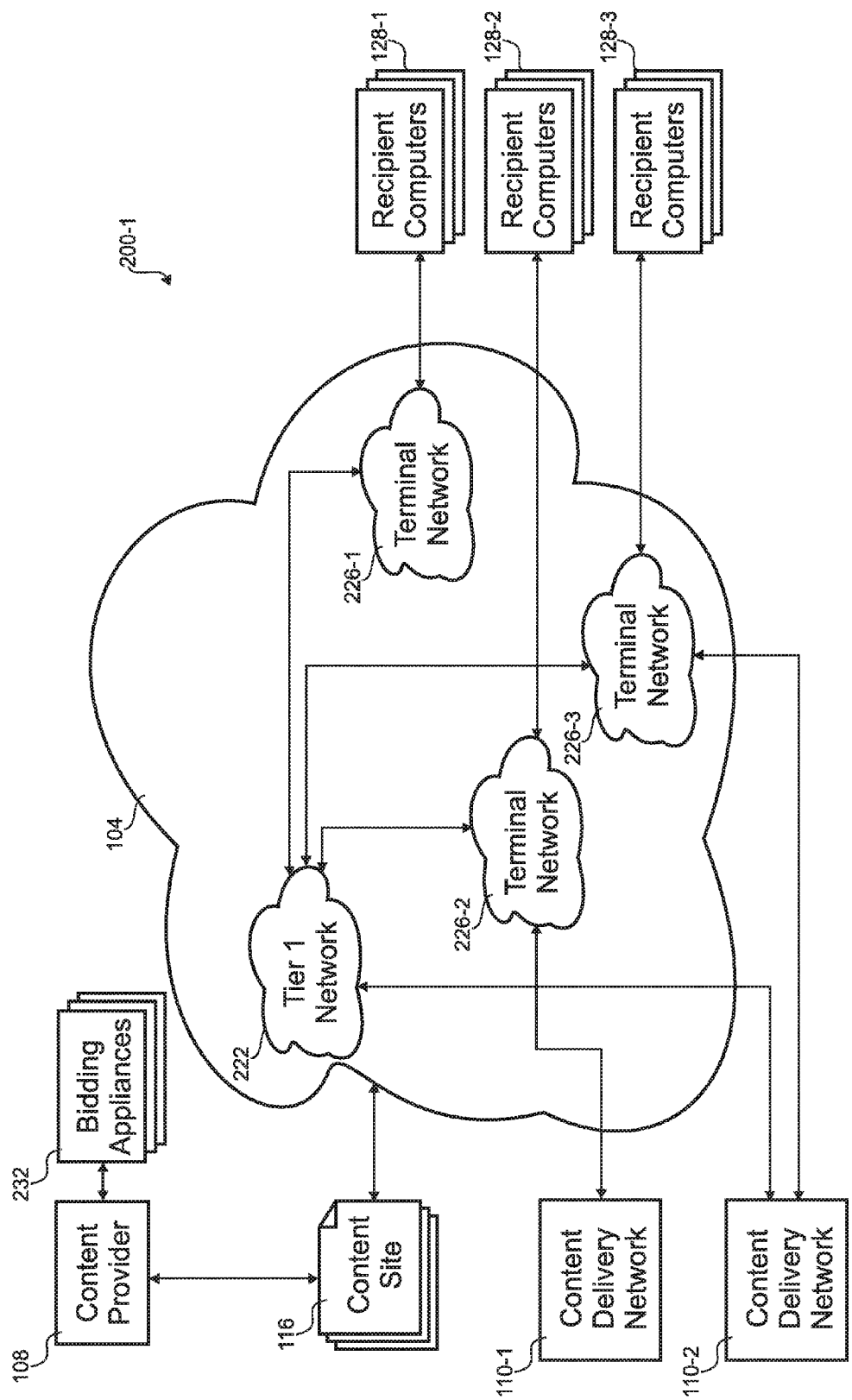
FIGS. 2A-2D are block diagrams of embodiments of the content system that expose routing details of the Internet.

With reference to FIG. 2A, a block diagram of an embodiment of the content system 200-1 that exposes routing details of the Internet 104 is shown. There are two bidding appliances 232 in this embodiment that allow the content provider 108 to get real time or advance quotes from the two CDNs 110. The content provider 108 refers to the bidding appliances 232 when a Bid URI is activated by the recipient 112. Each bidding appliance 232 is aware of the cost model or the respective CDN 110 such that an accurate quote can be provided. The quote is affected by both delivering and serving costs.

The Internet 104 is largely a group of networks 222, 226 that agree to carry each-others network traffic for free or some fee. These networks 222, 226 include tier 1 networks, peer networks and non-peer networks. Tier 1 networks are networks that can generally route to any address on the Internet, but they typically charge to receive content objects. Peer networks 220 accept network traffic from the CDN 110 with little or no additional cost, whereas non-peer networks charge a fee for network traffic that leaves the CDN 110. Terminal networks 226 are distinguishable from tier 1 networks 222 in that terminal networks 226 generally only accept content objects for a subset of valid IP addresses on the Internet 104. Typically, this subset is recipient computers 128 associated with that network. For example, a first group of recipient computers 128-1 is associated with a first network 226-1 and a second group of recipient computers 128-2 is associated with a second network 226-2.

Each CDN 110 has different arrangements with the various networks 226 that make up the Internet 104. Because of these differing arrangements, the delivering costs to each CDN 110 could vary for a particular recipient. For example, routing to a recipient 112 associated with the second group of recipient computer 128-2 would be handled differently by the two CDNs 110 in this embodiment. The first CDN 110-1 has a peering relationship with the second network 226-2 such that the delivering costs are small between the first CDN 110-1 and one of the second group of recipient computers 128-2. The second CDN 110-2 doesn't have a direct connection to the second network 226-2, but has a connection with the tier 1 network 222. The second CDN 110-2 would pass the content object through the tier 1 network 222 and the second network 226-2 to reach a recipient computer 128-2 in the second group. This second path would likely be more expensive as the second CDN 110-2 would pay for the transfer of the content object to the tier 1 network 222 and the second network 226-2 would likely pay the tier 1 network 222 to receive the content object.

Figure 2B:
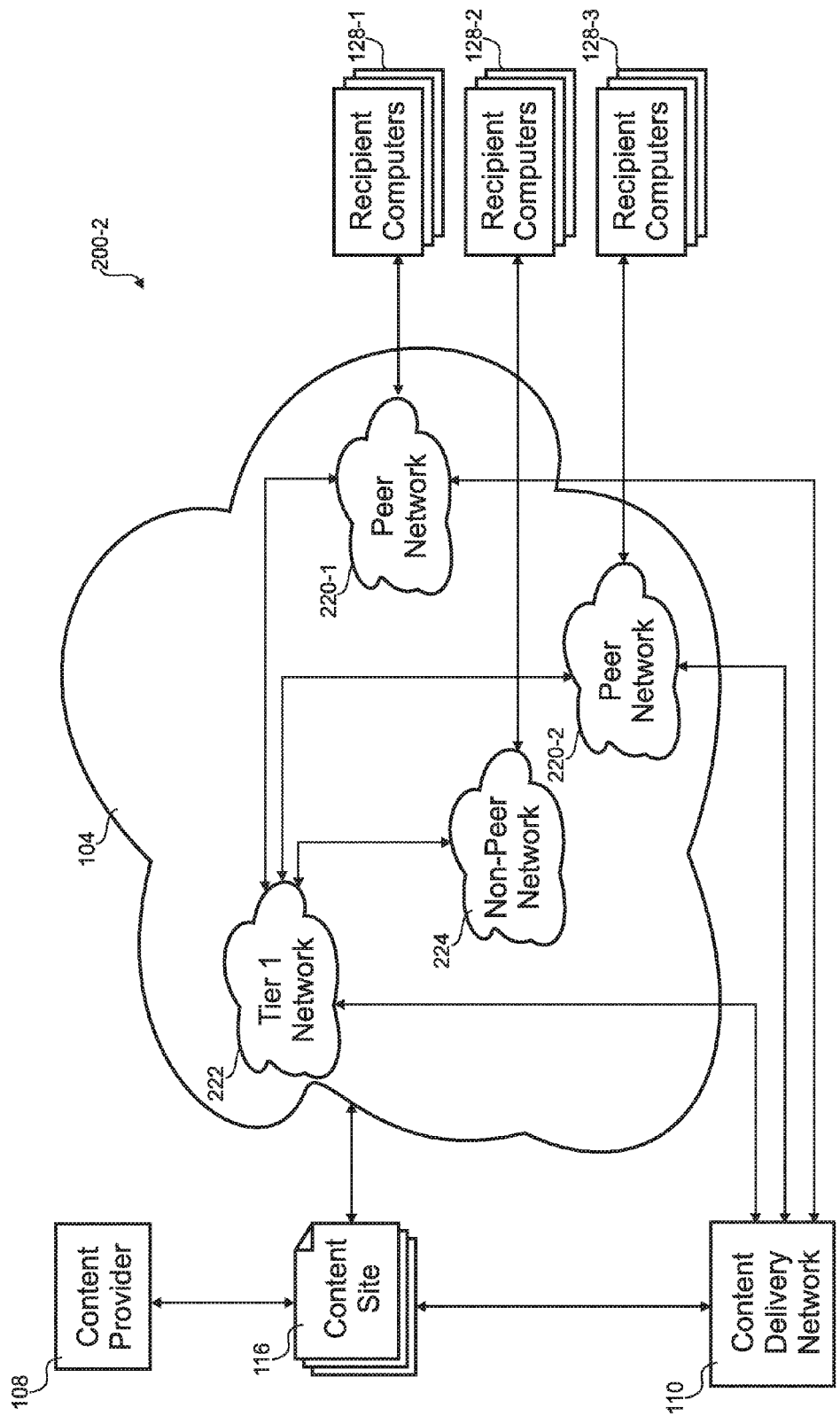

Referring next to FIG. 2B, a block diagram of another embodiment of the content system 200-2 that exposes routing details of the Internet 104 is shown. This embodiment includes a single CDN 110. The CDN 110 is coupled to two peer networks 220. To pass content objects to the second group of recipient computers 128-2, the CDN would rely upon the tier 1 network 222 to send the content object to the non-peer network 224, who would finally pass it to the recipient computer 128-2.

Figure 2C:
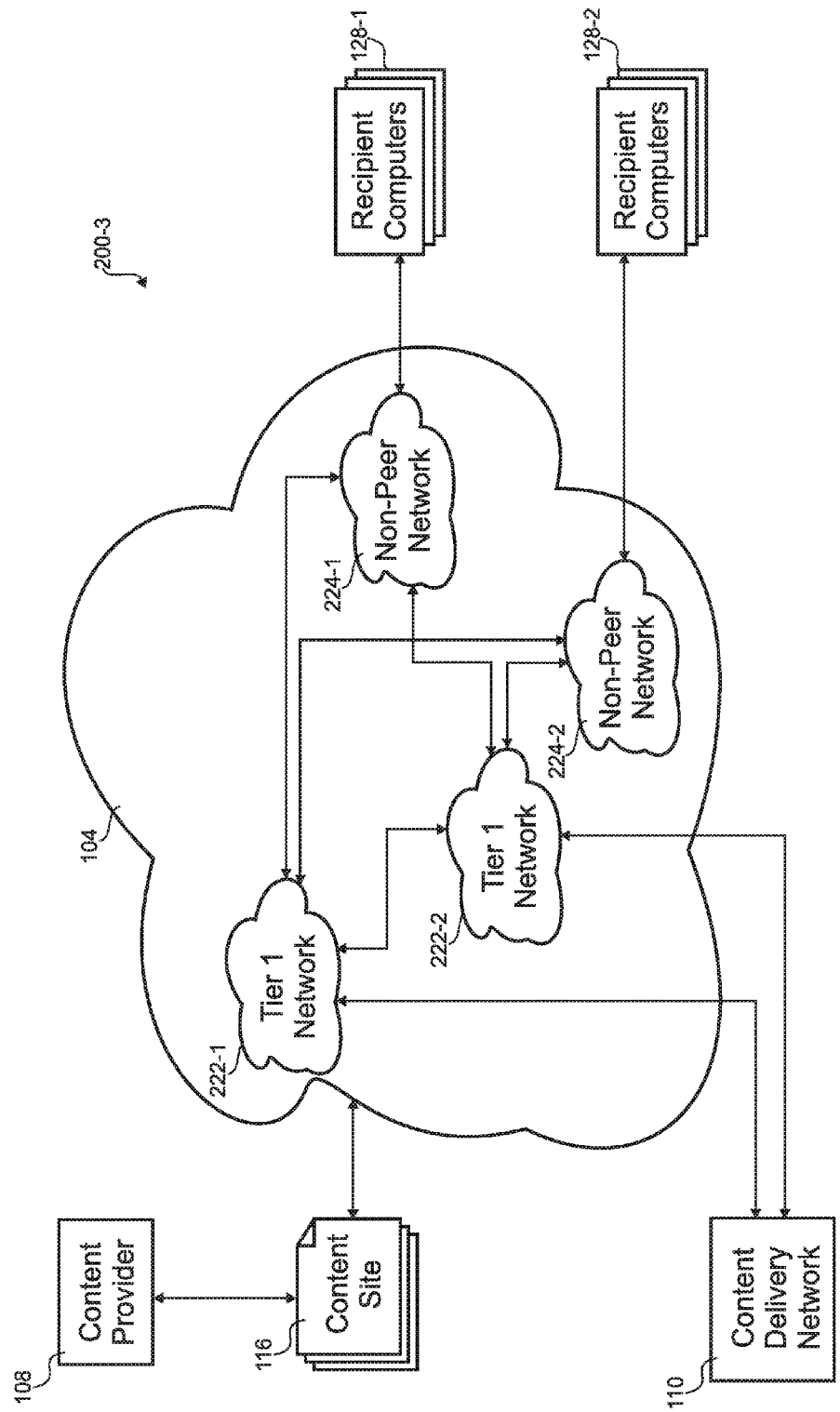

With reference to FIG. 2C, a block diagram of yet another embodiment of the content system 200-3 that exposes routing details of the Internet 104 is shown. In this embodiment, the CDN 110 has a relationship with two tier 1 networks 222. Each tier 1 network can rout to the two non-peer networks 224. The CDN can choose which tier 1 network 222 to use for a particular delivery. The content site might be given the option of either tier 1 network 222 for use when the content object is delivered. Various tier 1 networks 222 might be distinguished by a CDN 110 or content provider 108 based upon price, QoS and/or other factors.

Figure 2D:
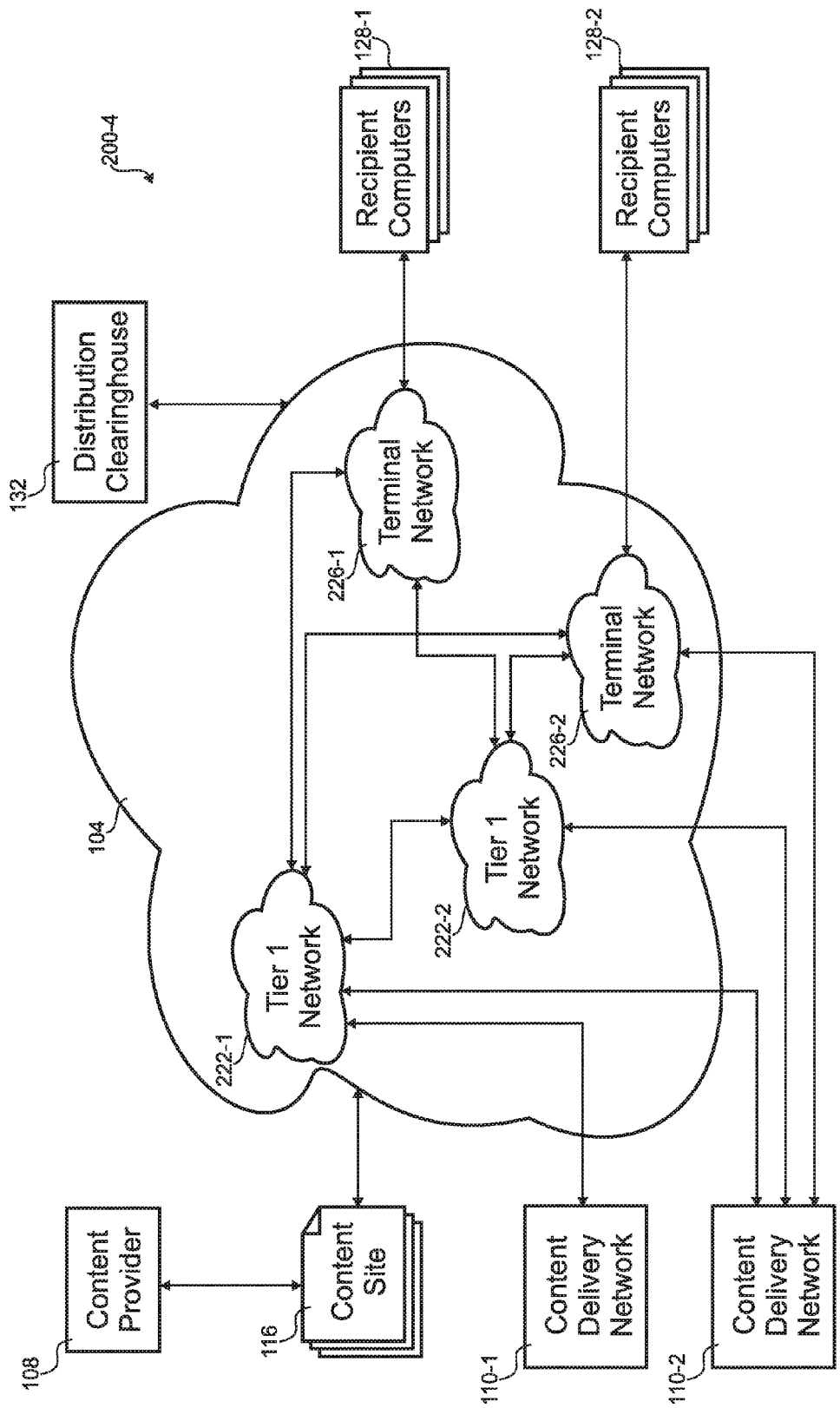

Referring next to FIG. 2D, a block diagram of still another embodiment of the content system 200-4 that exposes routing details of the Internet 104 is shown. The first CDN 110-1 only has a connection to the first tier 1 network 222-1 and must rely upon the first tier 1 network for delivery to the first and second group of recipient computers 128. The second CDN 110-2 has far more options by being linked to the first and second tier 1 networks 222 and having a peering relationship with the second network 226-2. Specifically, the first group of recipient computers 128-1 can be reached from either tier 1 network 222 and the second group of recipient computers 128-2 can be reached by any of the tier 1 networks 222 or the second network 226-2.

In this embodiment, there is a distribution clearinghouse 132 that could route the traffic over any number of CDNs 110. The distribution clearinghouse 132 could just charge for the serving cost of holding the content object database and the delivery interface to one or more content providers 108. The delivering cost would be an incremental cost on top of the serving costs. For example, if there were no delivery costs there would be a base serving price. That base price would be incrementally increased in accordance to the delivering costs. Some embodiments of the distribution clearinghouse 132 may not host any content and the CDNs could host their own content.

With the distribution clearinghouse 132, the content providers 108 upload one copy of an object to a common object store. The CDNs 110 would all connect to a common switch of the distribution clearinghouse 132. When a request comes in from a content provider 108 to the distribution clearinghouse 132, and all CDNs bid on delivery. Each CDN 110 could make multiple offers on delivery of an object depending on whether what path or network might take. A single CDN 110 might be able to route via multiple routes to reach the requesting recipient. The winning bidder CDN 110 grabs the object from the common object store and delivers it to the end user and bills the content provider 108 the quoted price.

Figure 3A:
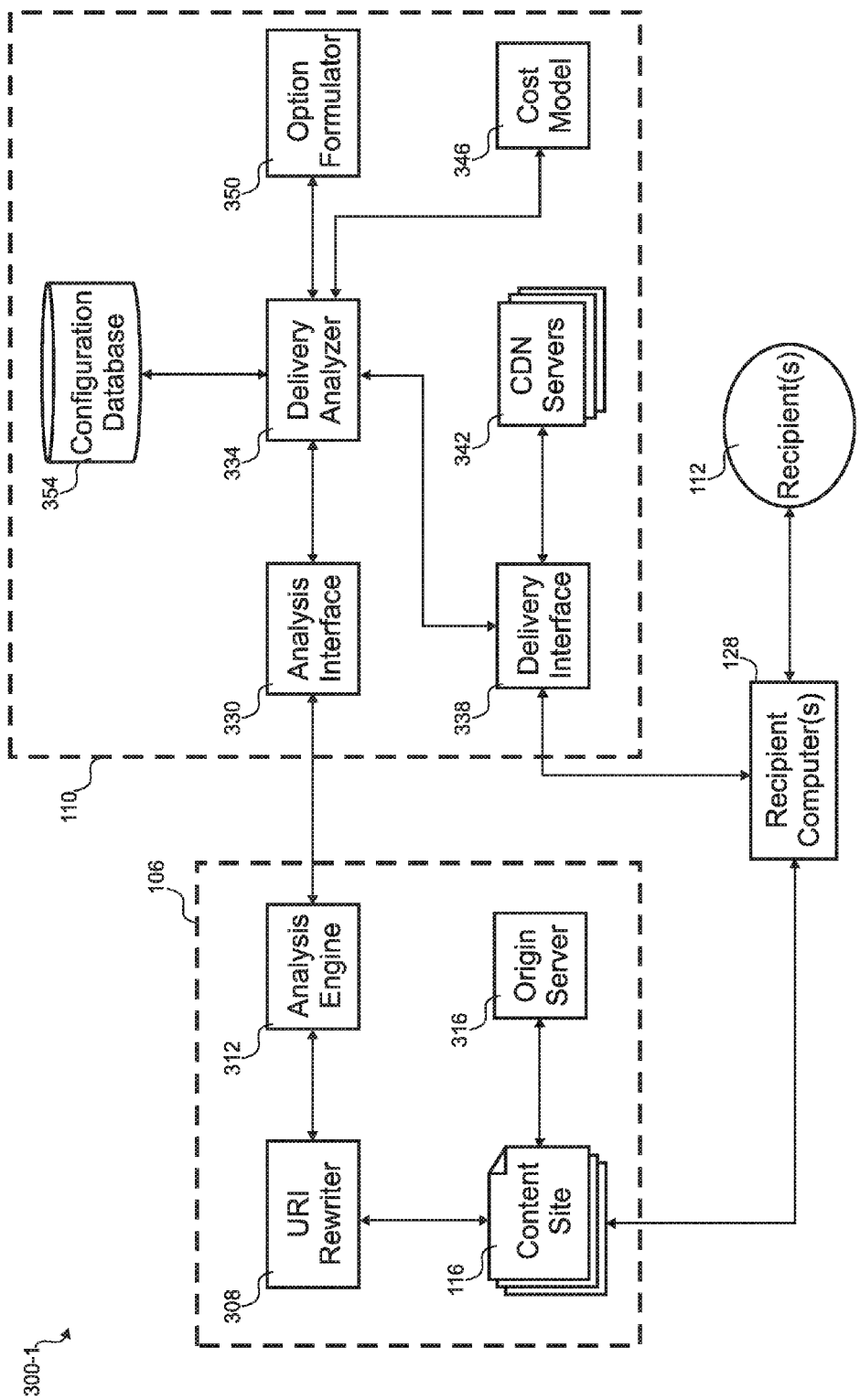
FIGS. 3A-3E are block diagrams of embodiments of the content system that have additional detail for the content originator and content delivery network (CDN)

With reference to FIG. 3A, a block diagram of an embodiment of a content system 300-1 is shown that has additional detail for the content originator 106 and CDN 110. The content originator 106 includes a content site 116 like before, but the content provider 108 is broken up into a URI rewriter 308, an analysis engine 312, and an origin server 316. The CDN 110 includes an analysis interface 330, a delivery analyzer 334, a configuration database 354, an option formulator 350, a cost model 346, a delivery interface 338, and a CDN server 342. Although this figure only shows a single content originator 106 and a single CDN 110, it is to be understood that there could be many of each in other embodiments.

The origin server 316 holds one copy of each content object for the content originator 106. Copies of the content object are provided to the various CDNs 110 so that requests may be served from the CDN 110. Periodically, the contents of the origin server 316 may be reconciled with the CDNs 110.

The URI rewriter 308 redirects requests for content objects away from the origin server 316 and toward a CDN 110. These redirects can be done when a web page is formulated by using the domain for the CDN 110 or can be redirected in real time. Real time redirections are done by activating a URI that points to the URI rewriter 308 who can get information to decide how to redirect the recipient to a chosen CDN 110. The URI rewriter 308 issues the Bid URI to receive a Deliver URI, that may be rewritten as a Redirect URI, in some circumstances.

Determining how a particular CDN 110 should deliver a content object or choosing between a number of CDNs is done by processing various information. The analysis engine 312 assists in that process. For real time quotes, the analysis engine 312 receives information from the URI rewriter relating to the content object, the recipient 112 and any delivery options that are passed along in the bidding process. For advance quotes, specifics on the recipient 112 is not possible, but the analysis engine 312 can gather more generalized quotes that can aid in choosing the CDN 110. The analysis engine 312 solicits bids from the various CDNs 110, bidding appliances 232 and/or distribution clearinghouses 132. Where a real time quote is unavailable, the analysis engine 312 can use an advance quote such that some CDNs 110 are quoting in real time, while others may not be.

The analysis engine 312 communicates with an analysis interface 330 of the CDN 110. Requests for real time and advance quotes are received by the analysis interface 330 from various content originators 106. Table I shows one example of what a real time bid message might contain. Once the quotes are produced, they are returned to the requesting content originator 106. The request could be in the form of a bid message that could indicate content object, recipient address, recipient network, and/or other options. Another embodiment embeds this bid message in a Bid URI. The quote could be part of a message that indicates pricing for the options and could include alternative pricing options. Table II is one example of a quote message issued in response to a bid message. In other embodiments, the quote message could be part of a Delivery URI provided back to the analysis engine 312.

TABLE I

Real Time Bid Message Example

| Field | Example |
|---|---|
| Bid Identifier | 34sd89732k |
| Recipient IP Address | 69.93.18.222 |
| Domain of Content Object | LLNW.com |
| Path of Content Object | /press/2005releases/ |
| File Name of Content Object | routemark.mp4 |
| Format | MPEG4 |
| Bitrate | 200 Kbps |
| Latency Options | 3 |
| QoS Level(s) | 3 |
| Packet Loss Options | 2 |
| Buffer Duration | 24 hours |
| Max. Volume | 1000 |

In the example of a real time bid and quote shown in Tables I and II, there are many options given for delivery. A bid identifier is used in both the bid and quote messages to allow correlation between the two. Information such as domain, path, and file name are given to identify the content object. The recipient IP address is given in the bid message and returns an associated terminal network, an anticipated connection type, an estimated connection speed, and geographic location.

TABLE II

Real Time Quote Message Example

| Field | Example |
|---|---|
| Bid Identifier | 34sd89732k |
| Terminal Network | France Telecomm |
| Connection Type | DSL |
| Estimated Connection Speed | 400 Kbps |
| Geographic Location | France |
| Latency Cost | .05, .02, .01 |
| Latency Options | .8, 1, 2 |

TABLE II-continued

Real Time Quote Message Example

| Field | Example |
|---|---|
| QoS Cost | .03, .05, .10 |
| QoS Level(s) | .5, 1, 1.5 |
| Packet Loss Cost | .02, .01 |
| Packet Loss Options | .8, 1.2 |

The content originator 106 asks for three latency options, three QoS options, and two packet loss options in this example. The CDN 110 will try to provide this number of various options according to these requests, but may not be able to in all circumstances. Each priced option is given in relation to some base value, for example, the latency option of 1 might be a base value of 100 ms, such that a 0.8 option would be 80 ms and a 2 option would be 200 ms. Latency, QoS and packet loss options are all estimates that the CDN 110 believes will likely be the case should that option be selected.

The price of each option is presented in the quote message. The URI rewriter 308 receives the various quote messages from the various CDNs 110 and chooses one with any options. In one example of selected options, the content originator 106 chooses a base value for latency and QoS, but a lower 0.8 packet loss. The cost for delivery would be nine cents based upon the information in Table II. A Redirect URI is formulated by the URI rewriter that is directed to a particular CDN 110 and selects certain options that are expressed in the Redirect URI. Some embodiments could have the content originator 106 convey some options separate from the URI in a message to the CDN 110.

The delivery analyzer 334 evaluates the bid to coordinate generation of a quote. Each content originator 106 can have preferences stored in a configuration database 354. Those preferences are used in deciphering the bid message and providing the options a particular content originator 106 has selected. For example, a particular content originator 106 may consistently want a particular streaming format, which could be stored in the configuration database 354.

To generate a quote, the delivery analyzer 334 uses the cost model 346 and an option formulator 350. There can be various options for delivery and the option formulator 350 can determine those. The configuration database 354 may indicate the types of options that should be quoted or the bid message can specify the options. For each of the options selected, the cost model 346 can estimate the price for various delivering and serving costs.

The delivery interface 338 receives redirect URIs that are formulated to cause the CDN 110 to serve the particular content object. The redirect URI may include the bid identifier, a recipient address, content object information and delivery options. Table III shows an example of those options that would be embedded in a URI. The delivery analyzer 334 may be notified of the redirect URI such that accounting can accurately charge a content originator 106 for the delivery.

TABLE III

Redirect URI Example

| Field | Example |
|---|---|
| Bid Identifier | 34sd89732k |
| Recipient IP Address | 69.93.18.222 |
| Domain of Content Object | LLNW.com |
| Path of Content Object | /press/2005releases/ |

TABLE III-continued

Redirect URI Example

| Field | Example |
|---|---|
| File Name of Content Object | routemark.mp4 |
| Latency Option | 1 |
| QoS Level | 1.5 |
| Packet Loss Option | .8 |

The URI rewriter takes the quote message to formulate a redirect URI that is provided to the recipient computer 128 to cause a request for the redirect URI from the selected CDN 110. Once the redirect URI is received, the CDN 110 will deliver or stream the indicated content object to the recipient computer 128. One or more CDN servers 342 serve up the content object.

Figure 3B:
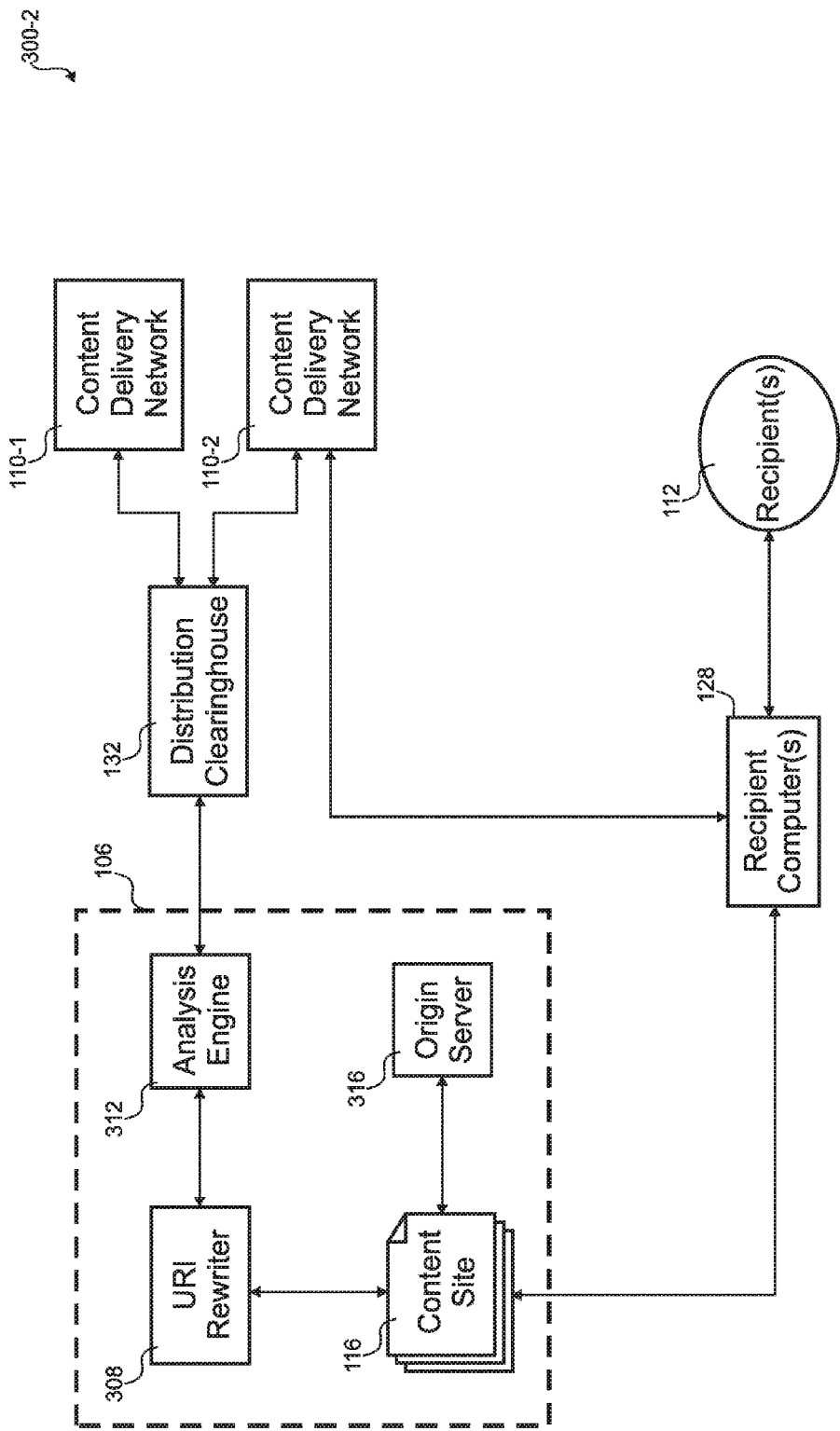

Referring next to FIG. 3B, a block diagram of another embodiment of a content system 300-2 is shown that has additional detail for the content originator 106 and CDN 110. The analysis engine 312 interacts with a distribution clearinghouse 132 in this embodiment. Bid messages are received by the distribution clearinghouse 132 and relayed to the various CDNs 110. The response quote messages are relayed by the distribution clearinghouse 132 back to the analysis engine 312.

Figure 3C:
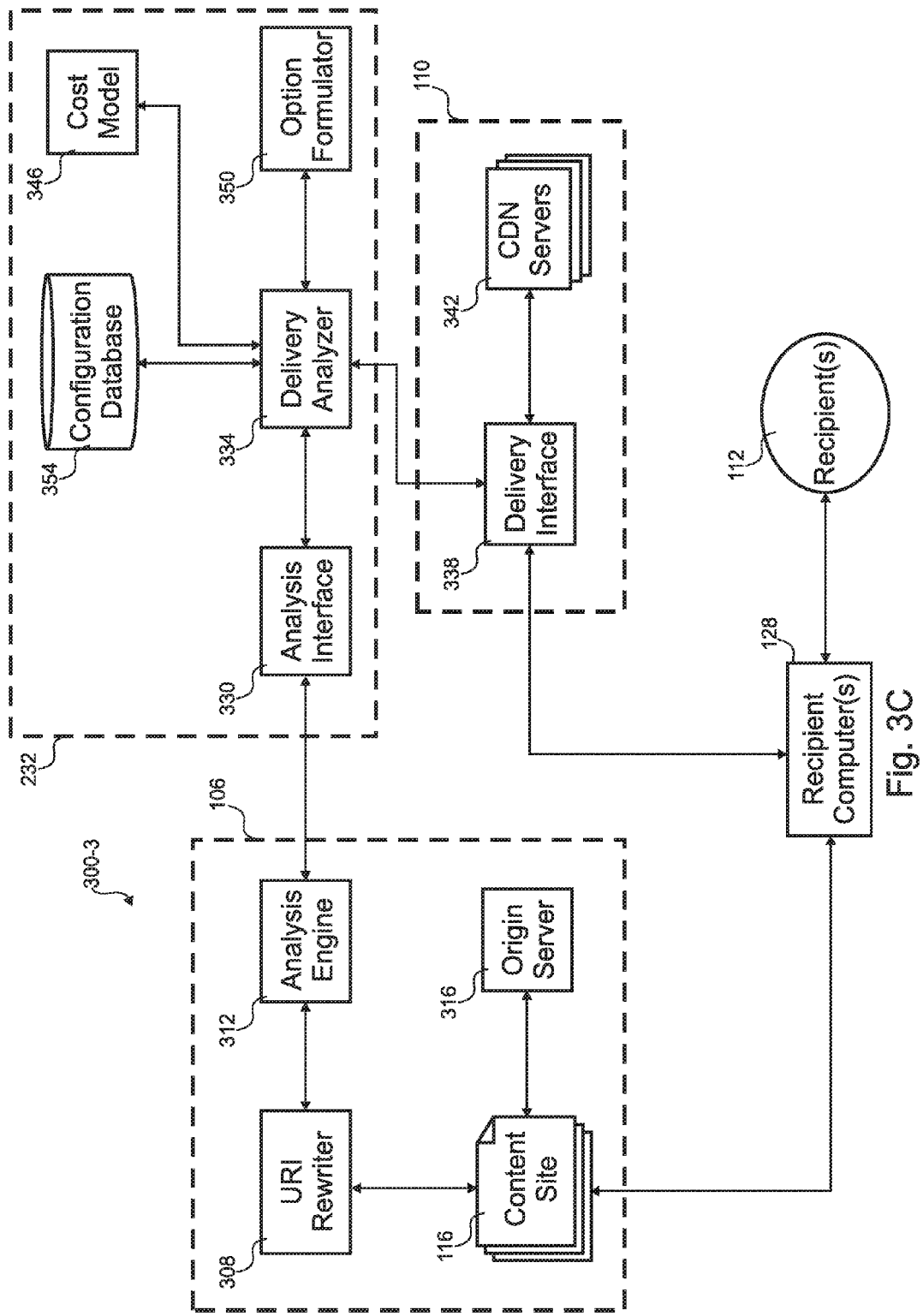

With reference to FIG. 3C, a block diagram of yet another embodiment of a content system 300-3 is shown that has additional detail for the content originator 106 and CDN 110. In this embodiment, the functional blocks of the CDN are removed to a bidding appliance 232 that is separate from the CDN 110. Specifically, the analysis interface 330, configuration database 354, delivery analyzer 334, option formulator 350, and the cost model 346 are all implemented in the bidding appliance 232. When determining which CDN to use, the content originator 106 consults the bidding appliance. The content object fulfillment is performed by the CDN 110 after rewriting the URI according to information from the bidding appliance 232.

Figure 3D:
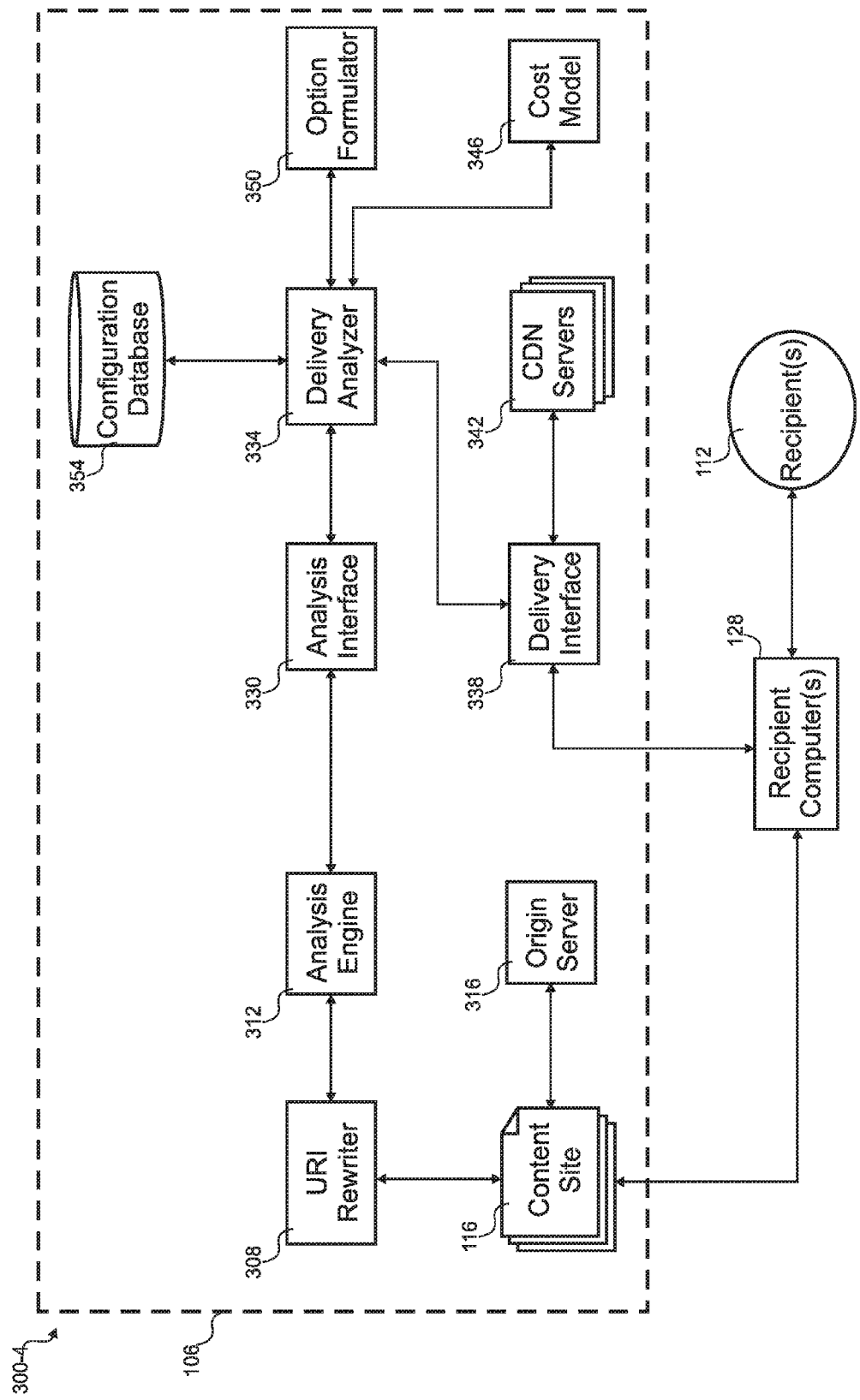

Referring next to FIG. 3D, a block diagram of yet another embodiment of a content system 300-4 is shown that has a captive CDN integral with content originator 106. In this embodiment, external CDNs 110 may be used in addition to the captive CDN. The ability for the captive CDN to deliver the content object efficiently could be evaluated considering use of an external CDN 110. In some cases, the content site 116 could directly supply the content object or stream without reliance on any external or captive CDN.

Figure 3E:
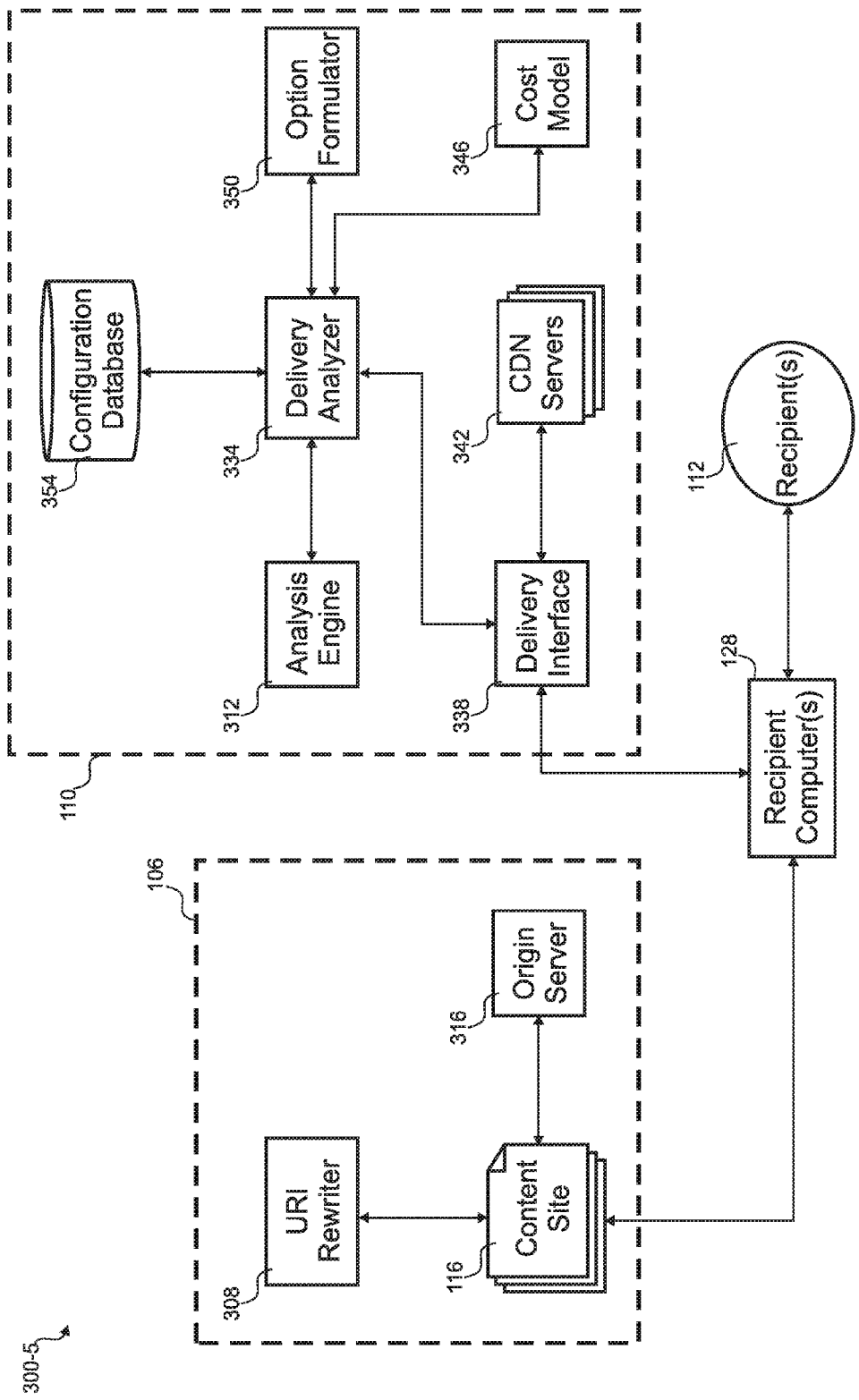

Referring next to FIG. 3E, a block diagram of yet another embodiment of a content system 300-5 is shown that has the content originator 106 deferring to the CDN 110 for choosing options according to pre-specified rules and/or criteria. In this embodiment, the content originator provides the CDN 110 with rules such that the analysis engine 312 can make decisions with any URI received by the delivery interface 338. These URIs may or may not have any options specified. The analysis engine 312 would decide how to serve a particular content object or stream request. For example, the content originator 106 may specify fulfilling only requests by a specific terminal network 226 at a high QoS, while supplying other terminal networks 226 at a lower QoS.

Figure 4A:
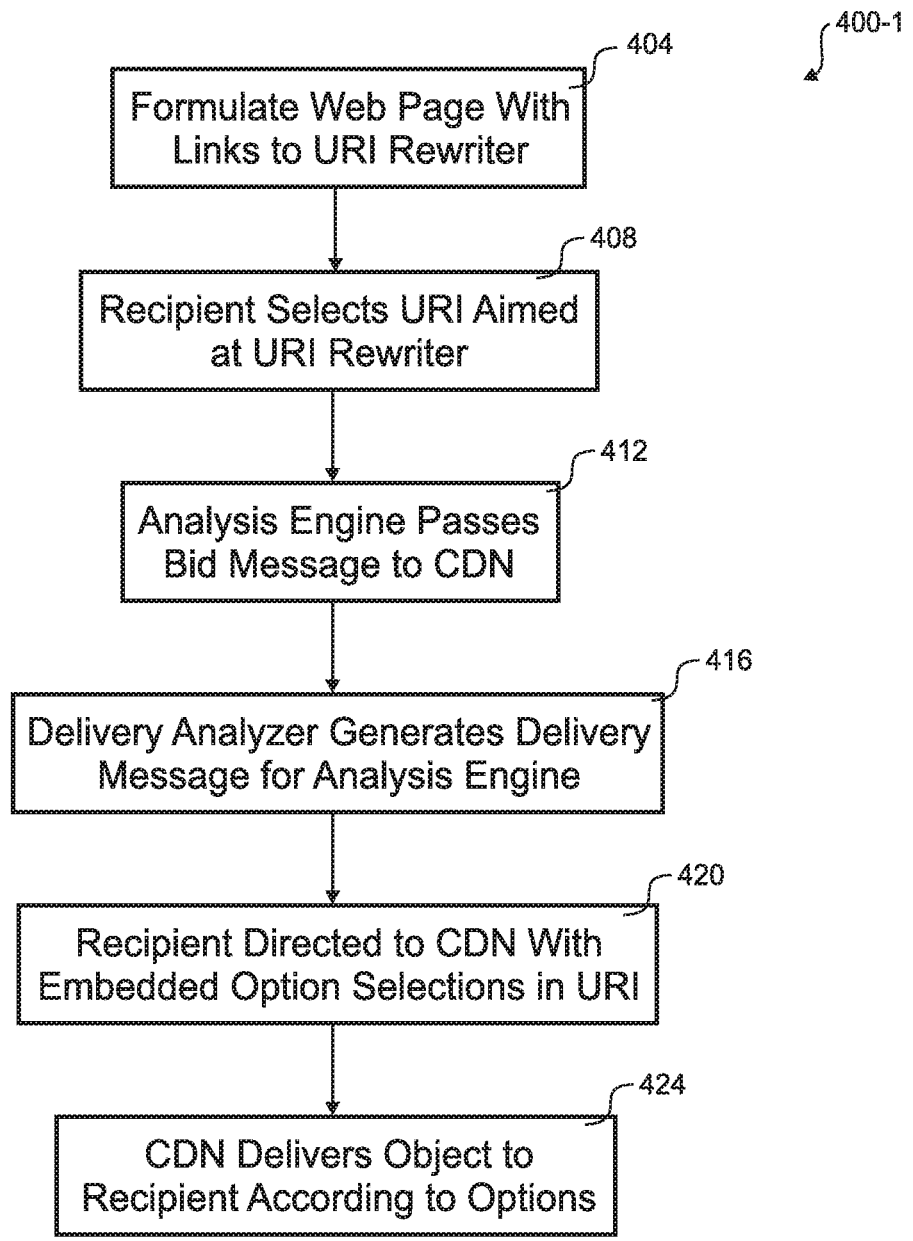
FIGS. 4A-4D are flow diagram of embodiments of a process for delivering content using one or more content delivery networks.

Referring next to FIG. 4A, a flow diagram of an embodiment of a process 400-1 for delivering content using one or more CDNs 110 is shown. The depicted portion of the process 400-1 begins in step 404 where a web page is formulated on the content site 116 for a recipient computer 128 that requests the web page. In this embodiment, the URIs in the web page meant for CDN delivery are aimed at the URI rewriter 308 to allow redirection. Other embodiments could have written all of the URIs before the web page is downloaded. The CDN 110 could be requested to bid on each URI before selected such that the redirect process is not needed in these other embodiments.

In step 408, the recipient selects a URI aimed at the URI rewriter 308. The URI rewriter 308 receives the URI and information about the recipient computer 128 and formulates a bid message. The analysis engine 312 passes the bid message to the analysis interface 330 of the CDN 110 in step 412. The delivery analyzer 334 references the configuration database 354, the option formulator 350 and the cost model 346 in step 416 to generate the delivery message, which is delivered to the analysis engine 312. In step 420, the recipient is redirected to the CDN by the URI rewriter 308. The redirected URI includes option selections in this embodiment to indicate those options selected by the content originator 106. The content object is delivered to the recipient computer 128 in step 424 according to the selected options.

Figure 4B:
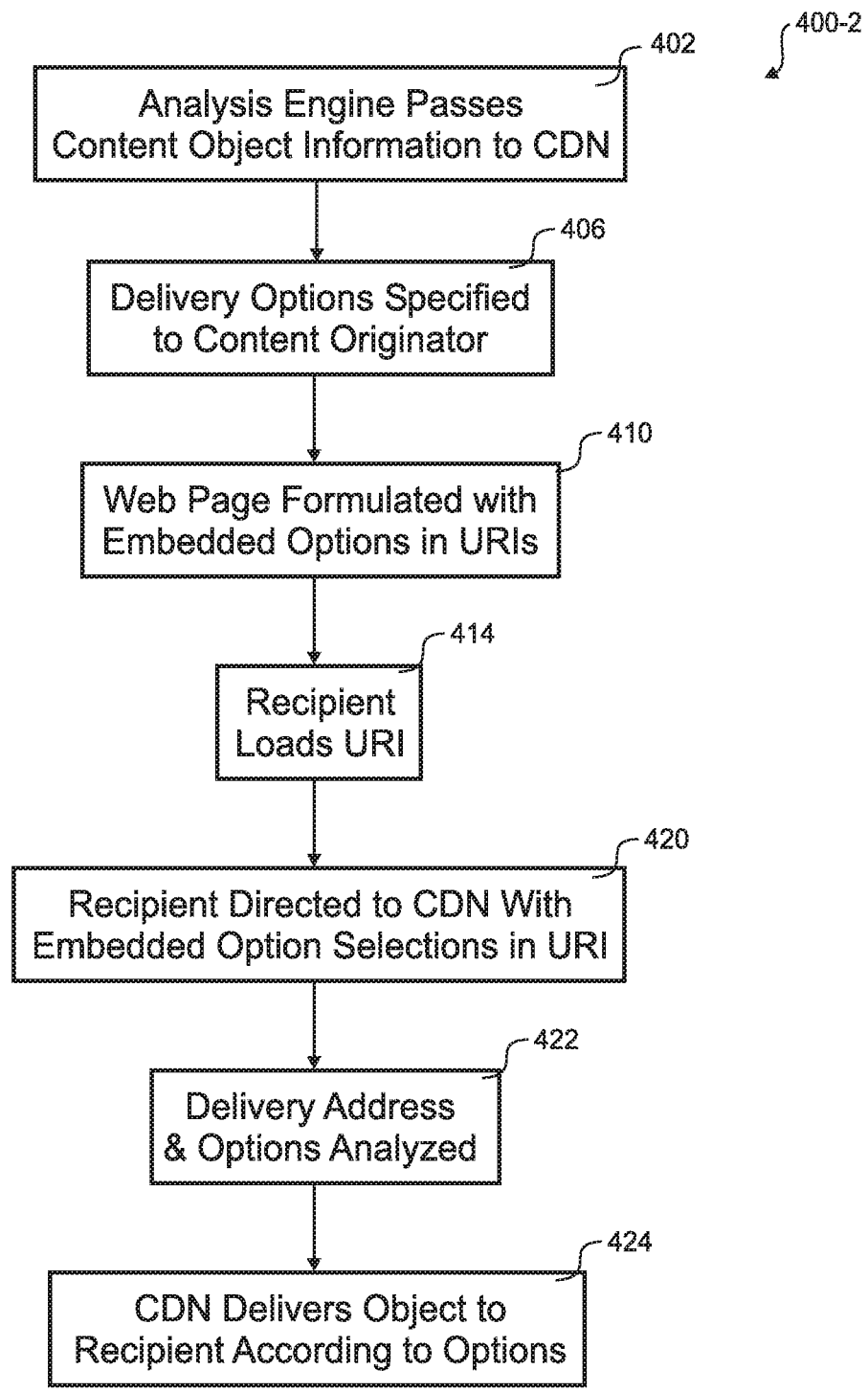

With reference to FIG. 4B, a flow diagram of another embodiment of a process 400-2 for delivering content using one or more CDNs 110 is shown. This embodiment quotes the content objects before a particular URI is requested. The depicted portion of the process 400-2 begins in step 402 where the analysis engine 312 passes the bid URI to the analysis interface 330. The bid URI has information similar to the bid message embedded within. Information on the particular recipient 112 requesting the web page may or may not be available, but where the information is available, it is passed to the analysis interface 330.

The delivery options and pricing are specified to the content originator through a delivery URI. Where there are no option alternatives, the delivery URI could be put directly into the web page. In this embodiment, the analysis engine 312 has the URI rewritten to set the options desired by the content originator 106 for delivery. The rewritten URI is embedded in the web page in step 410. In step 414, the rewritten URI is loaded into the browser of the recipient 112. The web browser is redirected to the CDN in step 420. The CDN analyzes the URI and options in step 422. The content object is delivered in step 424.

Figure 4C:
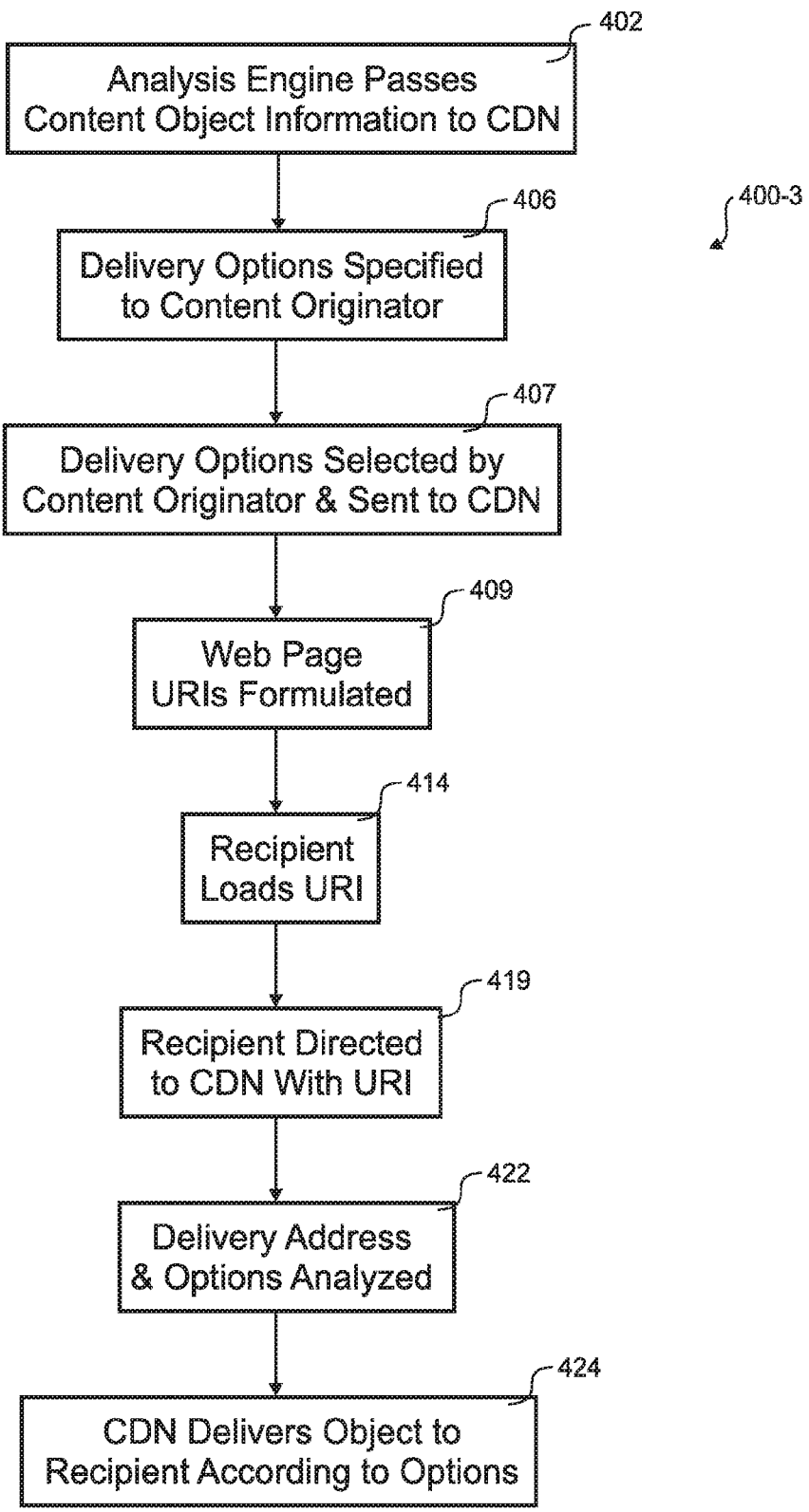

Referring next to FIG. 4C, a flow diagram of yet another embodiment of a process 400-3 for delivering content using one or more CDNs 110 is shown. This embodiment communicates options to the CDN separately from the URIs. The differences between FIG. 4B and this embodiment include steps 407 and 409 replacing step 410 and step 419 replacing step 420. Step 407 selects the various available options and communicates those options to the CDN 110. In step 409, the web page URIs are formulated to point at the CDN, but don't include options that were communicated in step 409. In step 419, the recipient computer 128 is redirected to the CDN using the URI from the web page.

Figure 4D:
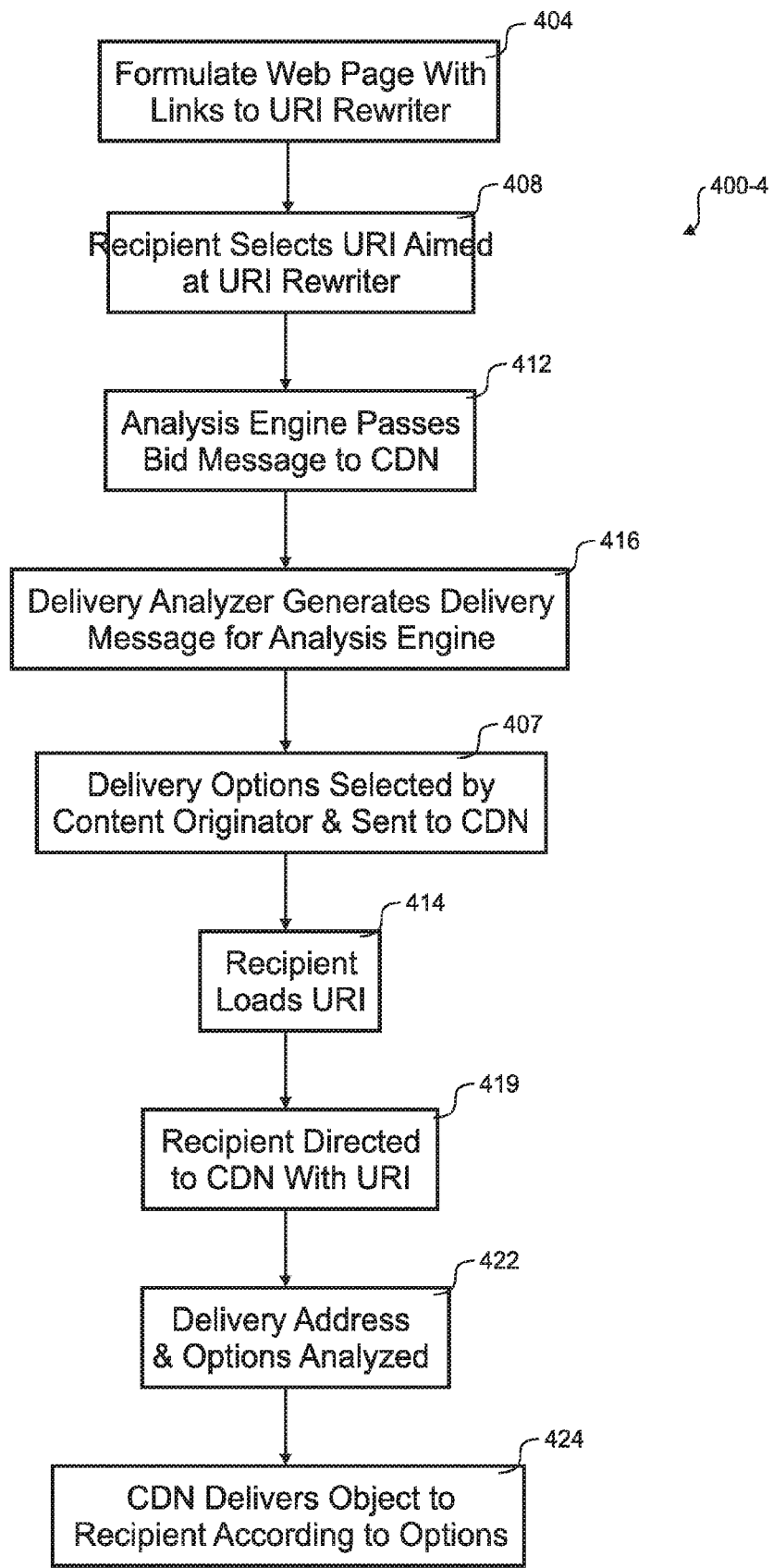

Referring next to FIG. 4D, a flow diagram of still another embodiment of a process 400-4 for delivering content using one or more CDNs 110 is shown. This embodiment is similar to that of FIG. 4A except that the delivery options are communicated separately to the CDN 110 such that the rewritten URI need not have any options embedded within. Specifically, step 420 of FIG. 4A is replaced with steps 407, 414, 419 and 422.

The options are selected and sent to the CDN in step 407. The recipient loads the URI in step 414. The recipient computer 128 is directed to the CDN 110 by the URI for fulfillment of the content object request in step 419. In step 422, the delivery address and options are analyzed to determine how the content object should be delivered.

Other alternatives for the system are possible in various embodiments. For example, the economic model for the price quote could be per content object having unlimited size, per the size of the total object, per the datarate required and/or the latency. Charges to the CDN for an aggregate datarate can change according to consumption. In some cases, higher aggregate volume decreases the cost for each increment of bandwidth. In other cases, the inverse relationship is possible. For example, as a data channel overloads, the cost for passage may increase. Various graphs and complex models may be used to best estimate passage based upon pricing terms, loading, etc.

In one embodiment, a CDN could indicate in response to an advance quote the ability to delivery content objects for a set price in some circumstances. When presented with a bid message, the CDN could take or decline the request at the set price. For example, the CDN might be able to deliver some content objects for ten cents. Any object that could be delivered for less than ten cents would be accepted, but those not accepted to could get a bid from the CDN and/or the content originator could seek a bid from another CDN.

In another embodiment, the content originator could arrange in an advance quote for a set number of deliveries at a given price or range of prices, but could then switch to a mode where only some deliveries were accepted. For example, the first ten thousand deliveries could be arranged at twenty-five cents each. The next five thousand deliveries could be delivered only when that delivery could be done for less than ten cents each.

In another embodiment, all deliveries could be accepted until some threshold after which only a fraction were accepted of those deliveries. For example, the first thousand are delivered at forty cents each. One in five of next five thousand are delivered so long as delivery can be done for less than thirty cents each. The one in five or other fraction could be chosen randomly, sequentially or by some other scheme.

While the principles of the invention have been described above in connection with specific apparatuses and methods, it is to be clearly understood that this description is made only by way of example and not as limitation on the scope of the invention.

What is claimed is:

1. A system for selecting networks to deliver content objects over the Internet, the system comprising a distribution clearing house, including one or more processors, configured to:
   receive a first request to deliver a first content object, wherein:
     the first request includes a first IP address; and
     the first IP address is indicative of a first location;
   receive a second request to deliver a second content object, wherein:
     the second request includes a second IP address;
     the second IP address is indicative of a second location; and
     the second location is different from the first location;
   receive a first delivery message, wherein:
     the first delivery message includes a financial delivery quote based on a delivery location, a connection type, an estimated connection speed, a latency cost, a latency option, a quality of service cost, a quality of service level; a packet-loss cost, and a packet-loss option;
     the first delivery message is from a content delivery network;

the content delivery network comprises a plurality of points of presence distributed geographically; and the content delivery network is operated by a first entity;

receive a second delivery message, wherein:

the second delivery message includes a financial delivery quote based on a delivery location, a connection type, an estimated connection speed, a latency cost, a latency option, a quality of service cost, a quality of service level; a packet-loss cost, and a packet-loss option;

the second delivery message is from a terminal network;

the terminal network provides end-user access to the Internet;

the terminal network is operated by a second entity; and the second entity is different from the first entity;

select the content delivery network to deliver the first content object based on the first delivery message and the first location; and select the terminal network to deliver the second content object based on the second delivery message and the second location.

2. The system for selecting networks to deliver content objects over the Internet as recited in claim 1, wherein the first content object and the second content object are the same content.

3. The system for selecting networks to deliver content objects over the Internet as recited in claim 1, the system further comprising the content delivery network.

4. The system for selecting networks to deliver content objects over the Internet as recited in claim 1, wherein:

the distribution clearing house is operated by a third entity; and the third entity is different from both the first entity and the second entity.

5. The system for selecting networks to deliver content objects over the Internet as recited in claim 1, wherein the distribution clearing house receives the first delivery message before receiving the first request.

6. The system for selecting networks to deliver content objects over the Internet as recited in claim 2, wherein the second request includes a URI that passes parameters to the terminal network for how the terminal network is to deliver the second content object.

7. A method for distributing requests for content objects over the Internet, the method comprising:

receiving a first request to deliver a first content object, wherein:

the first request includes a first IP address; and the first IP address is indicative of a first location;

receiving a second request to deliver a second content object, wherein:

the second request includes a second IP address;

the second IP address is indicative of a second location; and the second location is different from the first location;

receiving a first delivery message, wherein:

the first delivery message includes a financial delivery quote based on a delivery location, a connection type, an estimated connection speed, a latency cost, a latency option, a quality of service cost, a quality of service level; a packet-loss cost, and a packet-loss option;

the first delivery message is from a content delivery network; the content delivery network comprises a plurality of points of presence distributed geographically; and the content delivery network is operated by a first entity;

receiving a second delivery message, wherein:

the second delivery message includes a financial delivery quote based on a delivery location, a connection type, an estimated connection speed, a latency cost, a latency option, a quality of service cost, a quality of service level; a packet-loss cost, and a packet-loss option;

the second delivery message is from a terminal network;

the terminal network provides end-user access to the Internet;

the terminal network is operated by a second entity; and the second entity is different from the first entity;

selecting the content delivery network to deliver the first content object based on the first delivery message and the first location; and selecting the terminal network to deliver the second content object based on the second delivery message and the second location.

8. The method for distributing requests for content objects over the Internet as recited in claim 7, wherein the first content object and the second content object are the same content.

9. The method for distributing requests for content objects over the Internet as recited in claim 7, wherein the receiving the first delivery message from the content delivery network occurs after receiving the first request.

10. The method for distributing requests for content objects over the Internet as recited in claim 7, wherein:

the first request is received at a distribution clearing house;

the second request is received at the distribution clearing house;

the first delivery message is received at the distribution clearing house;

the second delivery message is received at the distribution clearing house;

the distribution clearing house is operated by a third entity; and the third entity is different from both the first entity and the second entity.

11. The method for distributing requests for content objects over the Internet as recited in claim 7, further comprising passing to the content delivery network a URI with parameters for how the content delivery network is to deliver the first content object.

12. The method for distributing requests for content objects over the Internet as recited in claim 7, wherein the first location is a geographic area.

13. The method for distributing requests for content objects over the Internet as recited in claim 7, wherein the first request further includes, for delivery, an expected volume, a quality of service level, a minimum latency, and/or a minimum bitrate.

14. A computer-memory device having instructions for distributing requests for content objects over the Internet that when executed perform the following steps:

receive a first request to deliver a first content object;

receive a second request to deliver a second content object;

receive a first delivery message, wherein:

the first delivery message includes a financial delivery quote based on a delivery location, a connection type, an estimated connection speed, a latency cost, a latency option, a quality of service cost, a quality of service level; a packet-loss cost, and a packet-loss option;

the first delivery message is from a content delivery network;

the content delivery network comprises a plurality of points of presence distributed geographically; and the content delivery network is operated by a first entity;

receive a second delivery message, wherein:
the second delivery message includes a financial delivery quote based on a delivery location, a connection type, an estimated connection speed, a latency cost, a latency option, a quality of service cost, a quality of service level; a packet-loss cost, and a packet-loss option;
the second delivery message is from a terminal network;
the terminal network provides end-user access to the Internet;
the terminal network is operated by a second entity; and
the second entity is different from the first entity;

select the content delivery network to deliver the first content object based on the first delivery message; and select the terminal network to deliver the second content object based on the second message.

15. The computer-memory device having instructions for distributing requests for content objects over the Internet as recited in claim 14, wherein:
the first request includes a first IP address;
the first IP address is indicative of a first location;
the second request includes a second IP address;
the second IP address is indicative of a second location;
the second location is different from the first location;
selecting the content delivery network to deliver the first content object is further based on the first location; and
selecting the terminal network to deliver the second content object is further based on the second location.

16. The computer-memory device having instructions for distributing requests for content objects over the Internet as recited in claim 14, wherein the first content object and the second content object are the same content.

17. The computer-memory device having instructions for distributing requests for content objects over the Internet as recited in claim 14, wherein the first request includes a URI that passes parameters to the content delivery network for how the content delivery network is to deliver the first content object.

18. The computer-memory device having instructions for distributing requests for content objects over the Internet as recited in claim 14, wherein the second request further includes, for delivery, an expected volume, a quality of service level, a minimum latency, and/or a minimum bitrate.

19. The computer-memory device having instructions for distributing requests for content objects over the Internet as recited in claim 14, wherein the instructions are further configured to receive the second request to deliver the second content object before receiving the second delivery message.

20. The computer-memory device having instructions for distributing requests for content objects over the Internet as recited in claim 14, wherein the second location is a geographic area.

* * * * *